US009818001B2

(12) United States Patent
Galant

(10) Patent No.: US 9,818,001 B2
(45) Date of Patent: *Nov. 14, 2017

(54) ELECTRONIC EQUIPMENT SECURITY DEVICE

(71) Applicant: COMPUCAGE INTERNATIONAL INC., Kleinburg (CA)

(72) Inventor: Steve Galant, Kleinburg (CA)

(73) Assignee: COMPUCAGE INTERNATIONAL INC. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,132

(22) Filed: Mar. 4, 2016

(65) Prior Publication Data

US 2016/0188913 A1    Jun. 30, 2016

Related U.S. Application Data

(63) Continuation of application No. 14/241,829, filed as application No. PCT/CA2012/050541 on Aug. 9, 2012, now Pat. No. 9,285,832.

(Continued)

(51) Int. Cl.
*F16M 11/04* (2006.01)
*F16M 13/00* (2006.01)
(Continued)

(52) U.S. Cl.
CPC .......... *G06F 21/88* (2013.01); *E05B 73/0082* (2013.01); *F16M 11/041* (2013.01);
(Continued)

(58) Field of Classification Search
CPC .... G06F 1/1633; F16M 11/041; F16M 11/06; F16M 11/105; F16M 13/02;
(Continued)

(56) References Cited

U.S. PATENT DOCUMENTS 2,164,299 A * 6/1939 Mandell .................. A47G 1/08
                                                            122/1 R
6,138,483 A    10/2000 Galant
(Continued)

FOREIGN PATENT DOCUMENTS

CN        102121556 A      7/2001
CN        201803070 U      4/2011
(Continued)

OTHER PUBLICATIONS

International Search Report for PCT Application No. PCT/CA2012/050541 dated Oct. 31, 2012.
(Continued)

*Primary Examiner* — Tan Le
(74) *Attorney, Agent, or Firm* — Polsinelli PC

(57) ABSTRACT

An apparatus for securing a component to prevent unauthorized removal of the component, the apparatus comprising a security device for securing the component, the security device having: a first corner engagement member pivotally mounted to a first arm for engaging a first corner of the component; a second corner engagement member pivotally mounted to a second arm for engaging a second corner of the component that is diagonal to the first corner; and a locking assembly to secure the first arm relative to the second arm.

19 Claims, 42 Drawing Sheets

Related U.S. Application Data

(60) Provisional application No. 61/603,784, filed on Feb. 27, 2012, provisional application No. 61/521,438, filed on Aug. 9, 2011.

(51) Int. Cl.

| | | |
|---|---|---|
| *G06F 1/16* | (2006.01) | |
| *G06F 21/88* | (2013.01) | |
| *F16M 11/10* | (2006.01) | |
| *F16M 11/22* | (2006.01) | |
| *E05B 73/00* | (2006.01) | |
| *F16M 13/02* | (2006.01) | |

(52) U.S. Cl.
CPC ........... *F16M 11/105* (2013.01); *F16M 11/22* (2013.01); *F16M 13/02* (2013.01); *G06F 1/1633* (2013.01); *F16M 13/025* (2013.01); *F16M 2200/08* (2013.01)

(58) Field of Classification Search
CPC .. F16M 13/025; F16M 2200/08; E05B 73/00; E05B 73/0082
USPC ............... 248/551, 552, 553, 316.1, 371; 361/679.56, 679.57, 807, 825; 70/57.1, 70/58, 62
See application file for complete search history.

(56) References Cited

U.S. PATENT DOCUMENTS

| | | | | |
|---|---|---|---|---|
| 6,237,375 | B1 * | 5/2001 | Wymer | E05B 73/0082 248/551 |
| 6,711,921 | B1 | 3/2004 | Yank | |
| 7,174,752 | B2 | 2/2007 | Galant | |
| 8,413,943 | B1 * | 4/2013 | Li | F16M 11/041 248/292.12 |
| 9,103,492 | B2 * | 8/2015 | Springer | F16M 11/041 |
| 9,285,832 | B2 * | 3/2016 | Galant | F16M 11/105 |
| 2003/0029208 | A1 | 2/2003 | Merrem et al. | |
| 2007/0040089 | A1 * | 2/2007 | Shiff | A47B 97/04 248/448 |
| 2008/0169393 | A1 | 7/2008 | Wang | |
| 2011/0062294 | A1 * | 3/2011 | Johnson | A47F 7/024 248/161 |
| 2011/0253855 | A1 | 10/2011 | Yu | |
| 2012/0103863 | A1 * | 5/2012 | Perez | E05B 73/0023 206/586 |
| 2012/0234055 | A1 | 9/2012 | Bland | |

FOREIGN PATENT DOCUMENTS

| | | |
|---|---|---|
| CN | 201818981 U | 5/2011 |
| CN | 201916659 U | 8/2011 |
| CN | 201916664 U | 8/2011 |
| CN | 102415744 A | 4/2012 |
| DE | 202010008792 U1 | 12/2010 |
| WO | 03074825 A1 | 9/2003 |

OTHER PUBLICATIONS

English Abstract of CN201916664; Retrieved from www.espacenet.com on Oct. 27, 2014.
English Abstract of CN102415744; Retrieved from www.espacenet.com on Oct. 27, 2014.
Extended European Search Report for PCT Application No. PCT/CA2012/050541; dated Jul. 7, 2015.
English Abstract of CN201818981; Retrieved from http://www.espace.net; retrieved on Aug. 13, 2015.
Machine Translation of DE202010008792; Retrieved from http://www.google.com/patents; Retrieved on Aug. 13, 2015.
Chinese Office Action for application No. 201280049730.X; dated Jun. 30, 2015.
English Translation of Chinese Office Action for application No. 201280049730.X; dated Jun. 30, 2015.
English Abstract of CN201803070; Published Apr. 20, 2011; Retrieved from www.espacenet.com on Sep. 25, 2015.
English Abstract of CN102121556; Published Jul. 13, 2011; Retrieved from www.espacenet.com on Oct. 14, 2015.
English Abstract of CN201916659; Published Aug. 3, 2011; Retrieved from www.espacenet.com on Oct. 14, 2015.

* cited by examiner

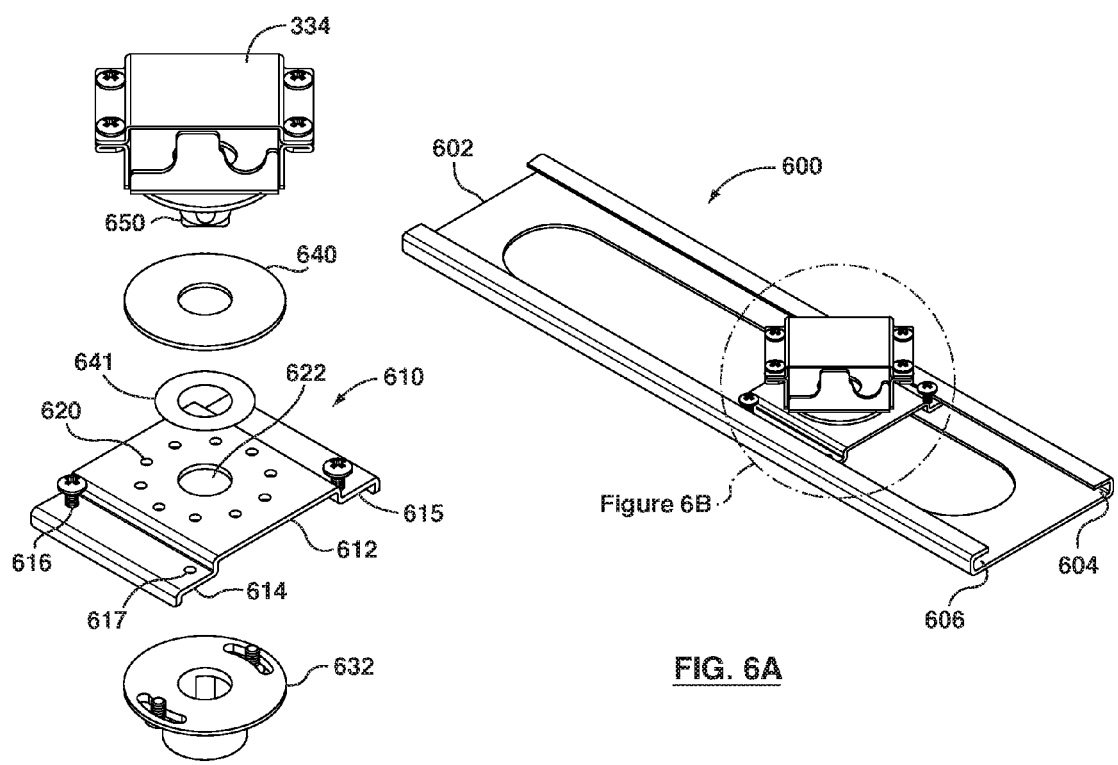

ELECTRONIC EQUIPMENT SECURITY DEVICE

This application is a continuation of U.S. patent application Ser. No. 14/241,829, filed Feb. 27, 2014, issued as U.S. Pat. No. 9,285,832, which is a national stage entry of International Application No. PCT/CA2012/050541 filed Aug. 9, 2012, which claims the benefit of U.S. Provisional Application No. 61/603,784 filed on Feb. 27, 2012 and U.S. Provisional Application No. 61/521,438 filed on Aug. 9, 2011.

TECHNICAL FIELD

The present disclosure relates generally to a security system for securing equipment such as an electronic tablet device to a structure.

BACKGROUND

A variety of techniques and apparatus have been developed over the years to prevent the unauthorized removal of computers and other office equipment, including for example U.S. Pat. No. 6,138,483 issued Oct. 31, 2000 to Galant, U.S. Pat. No. 6,308,928 issued Oct. 30, 2001 to Galant, and U.S. Pat. No. 7,174,752 issued Feb. 13, 2007 to Galant. It is desirable to provide an equipment security device which can easily be adjusted for use with and to display electronic tablet devices or equipment components of different sizes. It is also desirable to provide a security device that can be conveniently used to secure an electronic tablet device in both the vertical and horizontal viewing positions.

SUMMARY

According to one example there is provided a security system for securing an object having diagonal corner portions, the security system comprising: a security device for securing the object device; and a pivot assembly for securing the security device to a support structure, the pivot assembly comprising an alignment mechanism enabling the security device to rotate between a first orientation and a second orientation.

According to one example there is provided a security system for securing a component, the security system comprising: a security device securing the component; and a pivot assembly securing the security device to a support, the pivot assembly comprising an alignment mechanism enabling the security device to rotate between at least a first orientation and a second orientation.

According to one example there is provided a pivot assembly for securing a component, the pivot assembly being adapted to be mount a securing device to a support, the securing device engaging the component, the pivot assembly comprising an alignment mechanism enabling the security device to rotate between at least a first orientation and a second orientation.

According to one example there is provided a securing device for securing a component, comprising: a first corner engagement member for engaging a first corner of the component; a second corner engagement member for engaging a second corner of the component that is diagonal to the first corner, the first and second corner engagement members being slidably to each other, the security device being securable to prevent the first and second corner engagement members from being moved apart when securing the component, wherein the first corner engagement member and the second corner engagement member are each semi-rigidly mounted to respective arms that extend to a locking assembly such that the first corner engagement member and the second corner engagement member can each be moved in at least two dimensions relative to their respective arms.

According to an example embodiment, there is provided an apparatus for securing a component to prevent unauthorized removal of the component, the apparatus comprising a security device for securing the component, the security device comprising: a first corner engagement member pivotally mounted to a first arm for engaging a first corner of the component; a second corner engagement member pivotally mounted to a second arm for engaging a second corner of the component that is diagonal to the first corner; and a locking assembly to secure the first arm relative to the second arm.

According to another example embodiment there is provided an apparatus for securing a component to prevent unauthorized removal of the component, the apparatus comprising: a security device for securing the component, the security device comprising: a first corner engagement member for engaging a first corner of the component; a second corner engagement member for engaging a second corner of the component that is diagonal to the first corner; and a locking assembly to secure the first corner engagement member relative to the second corner engagement member; and a pivot assembly securing the security device to a support, the pivot assembly comprising an alignment mechanism enabling the security device to rotate between at least a first orientation and a second orientation, wherein the security device is removably secured to the pivot assembly and the pivot assembly is removably secured to the stand, wherein the pivot assembly cannot be removed from the stand when the security device is secured to the pivot assembly and the security device cannot be removed from the pivot assembly when securing the component.

According to another example embodiment there is provided a method of securing a tablet style electronic component using a security device that has a first corner engagement member pivotally mounted to a first arm for engaging a first corner of the component; a second corner engagement member pivotally mounted to a second arm for engaging a second corner of the component that is diagonal to the first corner; and a locking assembly to secure the first arm relative to the second arm. The method comprises: engaging the first corner of the component with the first corner engagement member; engaging the second corner of the component with the second corner engagement member; pivoting one or both of the first corner engagement member and the second corner engagement member to secure the engagement of the first and second corners; and securing the first arm relative to the second arm with the locking assembly to prevent separation of the first corner engagement member and the second corner engagement member.

According to one example there is provided methods of securing components using the security systems and devices described herein.

BRIEF DESCRIPTION OF THE DRAWINGS

For a better understanding of the invention, and to show how it may be carried into effect, reference will now be made, by way of example, to the accompanying drawings:

FIG. 6A is a partial perspective view of a security system according to a further example embodiment of the invention;

FIG. 6B is a partial exploded view of a the security system of FIG. 6A;

—FIG. 9A shows an exploded side view of the pivot assembly, FIG. 9B shows a back plan view of a securing member of the pivot assembly FIG. 9C shows a front plan view of a first cylindrical member 308, FIG. 9D shows a front plan view of the back housing of a casing of the pivot assembly, FIG. 9E shows side views of a second cylindrical member and a spring loaded cam follower, and FIG. 9G is a side view of an alternative embodiment of the pivot assembly;

DESCRIPTION OF EXAMPLE EMBODIMENTS

Figure 1A:
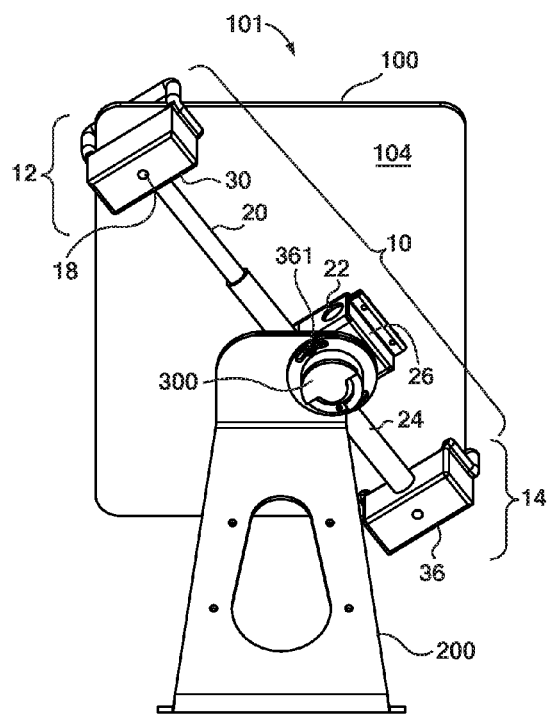
FIG. 1A is a rear view of a security system shown in use securing a tablet in a portrait orientation in accordance with a first example embodiment of the invention.

With reference to FIG. 1A, a security system in accordance with an example embodiment of the application is indicated by general reference number 101. The security system 101 includes a security device 10, a mounting bracket or support stand 200, and a pivot assembly 300 that pivotally connects the security device 10 to the stand 200.

As shown in FIG. 1A, the security device 10 includes first and second corner engagement members 12 and 14 which can be connected together to secure a piece of equipment such as an electronic tablet device 100 therebetween, as will be explained in greater detail below. The equipment being secured can include other types of rectangular devices including smart phones, closed laptops, PDA's etc, display screens, media players, etc. An elongate connecting member such as a cylindrical rod or arm 20 extends from the first corner engagement member 12 towards the second corner engagement member 14. In an example embodiment, the corner engagement member 12 is semi-rigidly attached to the arm 20. A further elongate connecting member such as a tubular arm or sleeve 24 extends from the second corner engagement member 14 towards the first corner engagement member 12. The corner engagement member 14 is semi-rigidly attached to an end of the tubular sleeve 24. In the illustrated embodiment, the tubular sleeve 24 is configured to telescopically receive the elongate arm 20 of the first corner engagement member 12 such that the first and second corner engagement members can be moved relative to each other. In an example embodiment, the tubular sleeve 24 has a lock assembly 26 mounted thereon (see FIG. 1D) for engaging ratchet teeth 28 that are provided along the length of an extending portion of the arm 20.

Figure 1B:
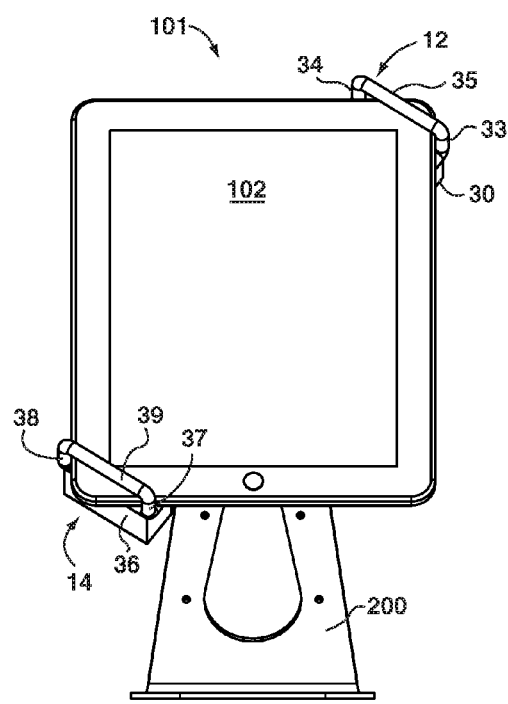
FIG. 1B is a front view of the security system of FIG. 1A shown in use in securing a tablet in a portrait orientation.
Figure 1C:
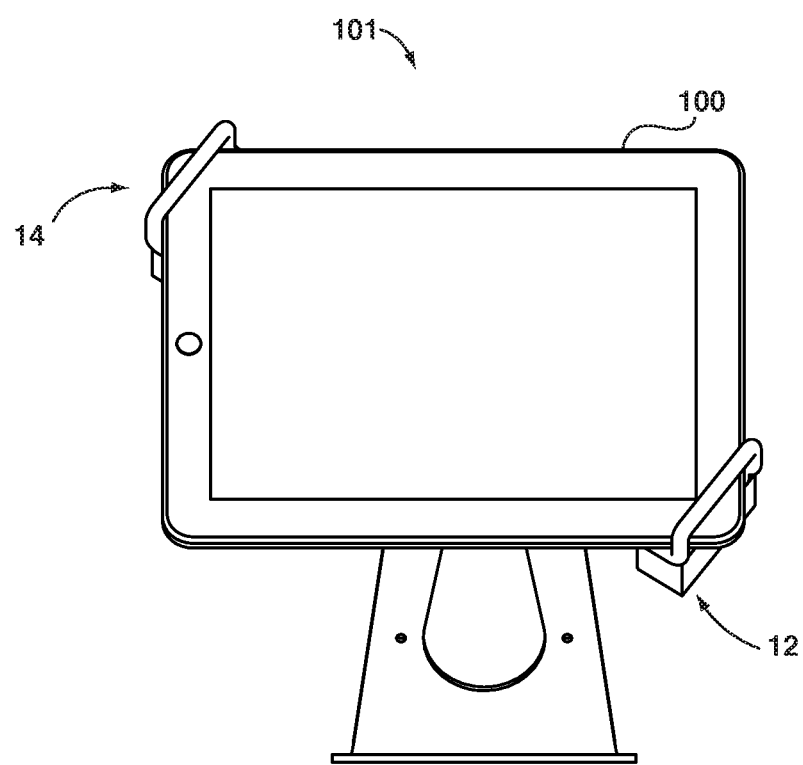
FIG. 1C is a front view of the security system of FIG. 1A shown in use in securing a tablet in a landscape orientation.
Figure 1D:
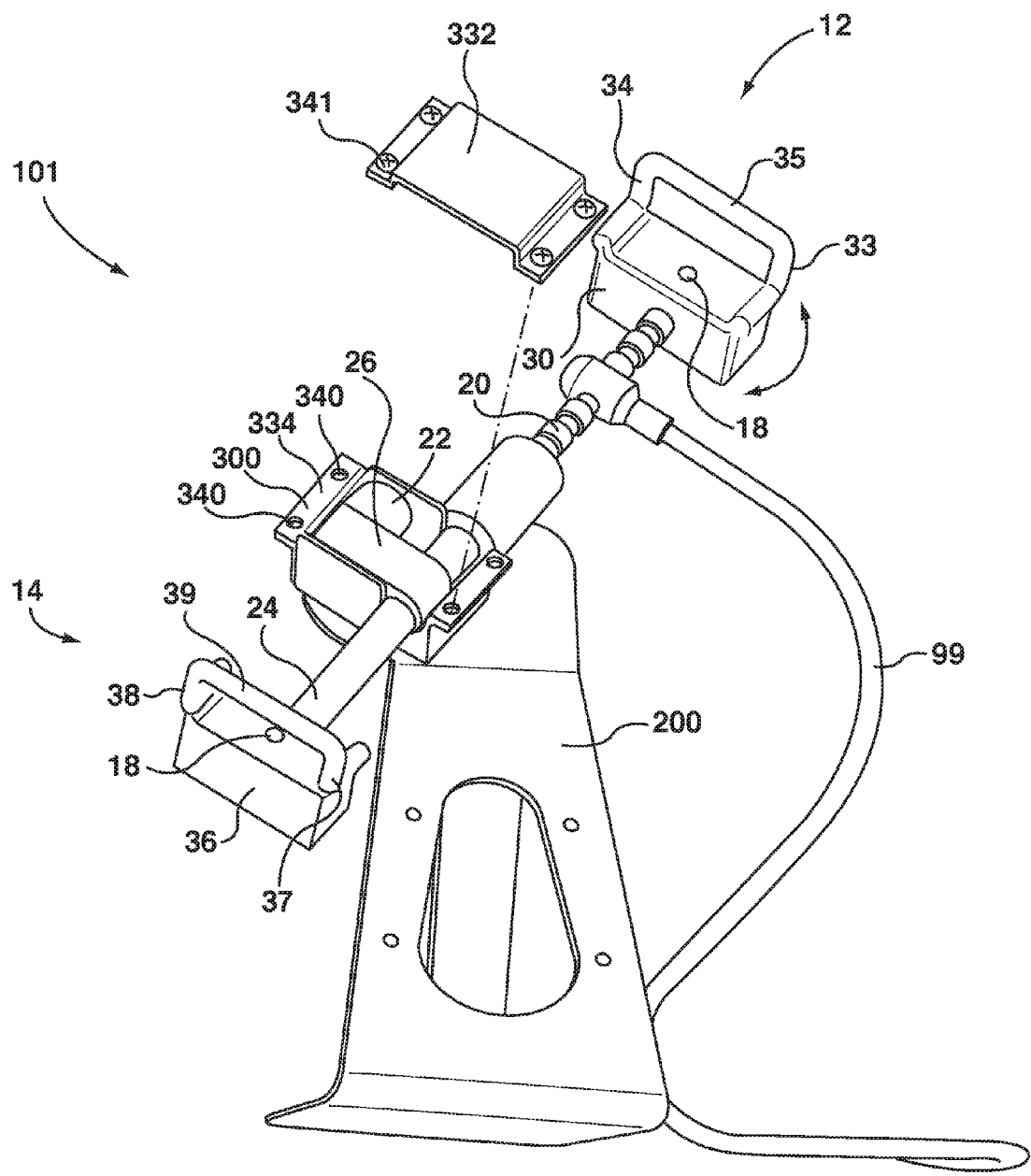
FIG. 1D is a front perspective view of the security system of FIG. 1A without a tablet secured thereto.

In the illustrated embodiment of FIGS. 1A, 1B and 1D the first corner engagement member 12 includes a base 30, and first and second sidewall or edge engagement members 33, 34 rigidly attached to and extending orthogonally from the base 30 in a spaced-apart parallel fashion from each other. The first corner engagement member 12 also includes a front engagement member 35 spaced apart from and parallel to the base 30, rigidly attached to the extending ends of the first and second edge engagement members 33, 34.

The second corner engagement member 14 has a similar configuration as the first corner engagement member 16. The second corner engagement member 14 includes first and second sidewall or edge engagement members 37, 38 rigidly attached to and extending orthogonally from the base 36 in a spaced-apart parallel fashion from each other. The second corner engagement member 14 also includes a front engagement member 39 spaced apart from and parallel to the base 36, rigidly attached to the extending ends of the first and second edge engagement members 37, 38.

As can be appreciated from the illustration of FIGS. 1A and 1D, when the locking arm 20 is received within the tubular sleeve 24 of the lock assembly 26, the first and second corner engagement members 12, 14 are opposed to each other and define opposing openings. In use, an object that has opposite corners, for example a rectangular electronic or computing device such as a tablet device 100 can be engaged between these opposed corner engagement members 12, 14. For example, as shown in FIGS. 1A and 1B, the tablet device 100 is secured in the security device 10 as the opposite corner portions of the tablet device 100 are received within and restrained by the corner engagement members 12 and 14. In particular, the tablet device 100 sidewalls or edges meeting at one corner are engaged by the edge engagement members 33, 34 of first corner engagement member 12, and with the front and back panels at such corner portion of the tablet device 100 being located between and restrained by the front engagement member 35 and base 30. The second corner engagement member 14 engages the diagonally opposed corner of the tablet device 100 in a similar manner. In one embodiment, one or more of the first and second corner engagement members 12, 14, the locking arm 20 and sleeve 24 may be covered with a material that will prevent damage to the tablet device 100 while the tablet device 100 is secured in the security device 10, such as a resilient plastic or rubberized coating for example. First and second corner engagement members 12, 14 could take a number of configurations other than as shown in FIGS. 1A-1D. By way of example, U.S. Pat. No. 7,174,752 discloses a number of different corner engagement member configurations that can be suitably used to secure opposite corners of a rectangular object.

Figure 1E:
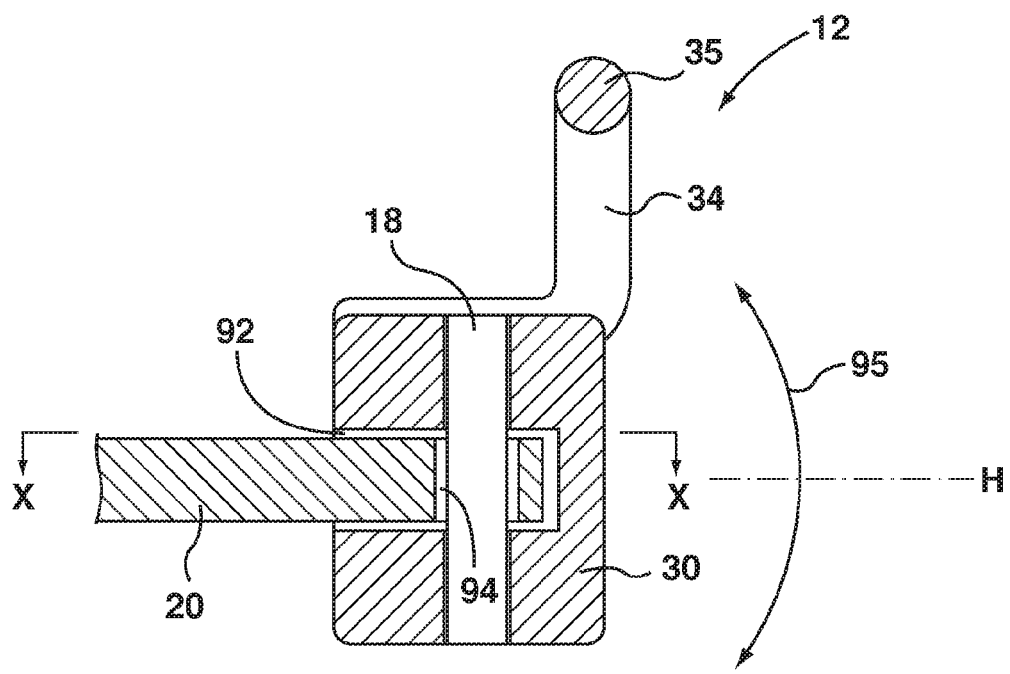
FIG. 1E is a partial sectional view of a corner engagement member of the security system of 1A.
Figure 1F:
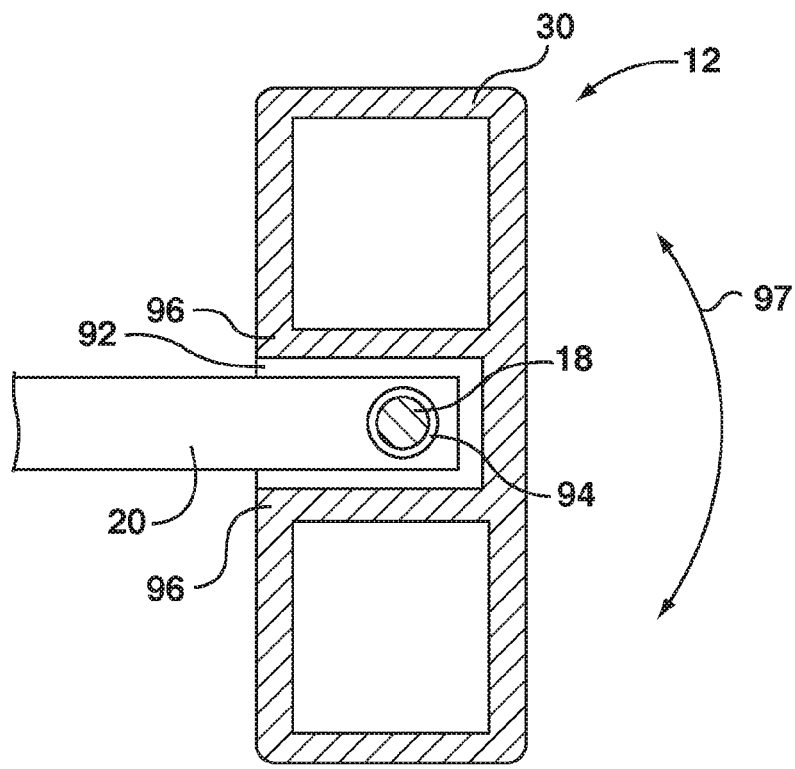
FIG. 1F is a partial sectional view taken along the lines X-X of FIG. 1E.

As previously discussed, in at least some example embodiments the first corner engagement member 12 is semi-rigidly attached to the elongate arm 20 and the second corner engagement member 14 is semi-rigidly attached to tubular sleeve 24. In an example embodiment, the first and second corner engagement member s 12, 14 are semi-rigidly attached to the locking arm 20 and tubular sleeve 24 respectively such that the first and second corner engagement member s 12, 14 may partially swivel or pivot along at least two planes. By way of example, as shown in FIGS. 1A and 1D the first corner engagement member 12 is secured to the elongate arm 20 by a pin 18 that passes through the base 30 of first corner engagement member 12 and through the end of the elongate arm 20. As shown in greater detail in the sectional view of FIG. 1E, in an example embodiment, the end of elongate arm 20 is received within a socket or slot 92 defined by the base 30, with the pin 18 being secured to the base 30 and passing through a hole 94 that extends across a diameter of the arm 20. As shown in FIG. 1E, the slot 92 has a height that is greater than the diameter of the end of arm 20 and the hole 94 through the arm 20 has a diameter greater than that of pin 18 such that the corner engagement member has some free play to pivot within predetermined limits in the direction indicated by arrow 95 in FIG. 1E. In some example embodiments, pivoting in the range of 5 to 15 degrees about reference line H in the direction indicated by arrow 95 can be accommodated. Referring to FIG. 1F, which is a sectional view taken at 90 degrees to FIG. 1E, the base 30 of corner engagement member 12 can pivot in the direction indicated by arrow 97 about the axis of pin 18 relative to the end of arm 20. In an example embodiment, the base 30 includes a pair of stop members 96 located on opposite sides of the arm 20 for limiting the degree of rotation of corner engagement member 12 about pin 18 relative to the end of arm 20. In some example embodiments, the stop members 96 permit the corner engagement member 12 to pivot 5 to 30 degrees about the axis of pin 18. In example embodiments, the second corner engagement member 14 has a similar configuration as the first corner engagement member 12 and is connected by a respective pin 18 in a similar manner to the end of sleeve 24. The pivot or swivel of the corner engagement members 12, 14 permits some free play in multiple directions that can in at least some configurations make it easier to engage the tablet device 100 between the corner engagement members 12, 14. In some example embodiments, the amount of the pivot about the axis of pin 18 or about the reference H may be adjustable (for example by set screws) to reduce or prevent the free play or rotation or increase the free play or rotation of the corner engagement members 12, 14. In some example embodiments, the corner engagement members 12, 14 could be rigidly secured to the ends of the arm 20 and sleeve 24, respectively, without free-play being permitted.

Figure 5:
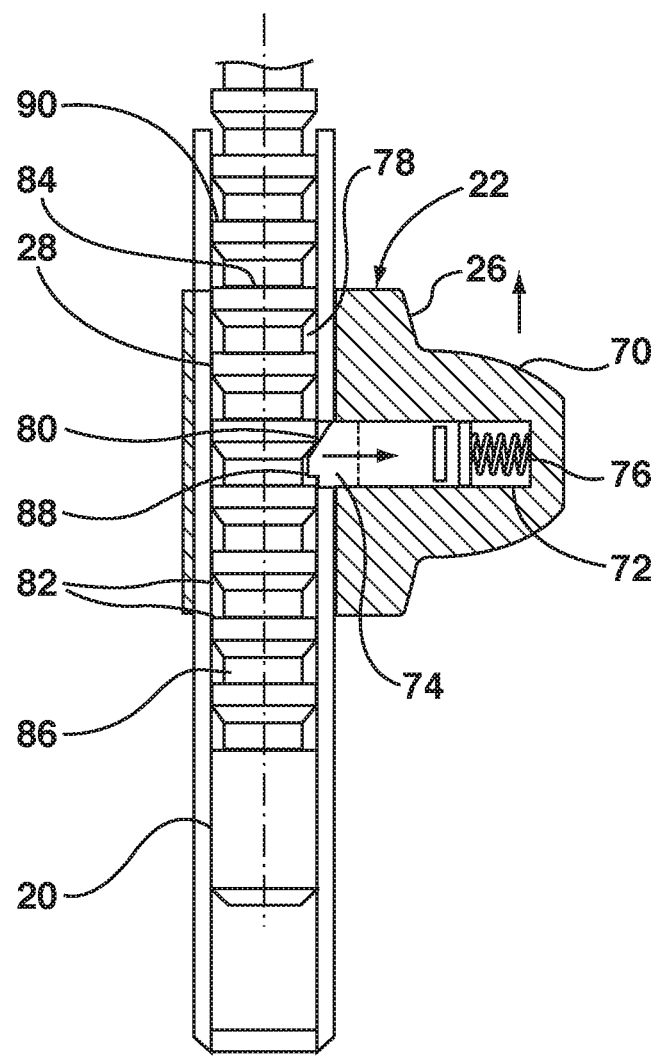
FIG. 5 is a partial sectional view of a lock assembly of the security device.

An example embodiment of the locking assembly 26 will now be described with reference to FIG. 5. In an example embodiment locking assembly 26 has a similar configuration and construction as the locking assembly described in U.S. Pat. No. 7,174,752. In this regard, the locking assembly 26 has a hardened steel housing 70 having a blind hole 72 in which is situated a spring loaded pawl 74. The spring loaded pawl 74 is normally biased into a locked position under the influence of a spring 76. In this position, the spring 76 biases the pawl 74 part way into a passage way 78 of the lock assembly 26 for receiving the arm 20 therethrough. The pawl 74 presents an inclined surface 80 for meeting a frustial conical surface 82 of the ratchet teeth 28 that are provided along the arm 20. This configuration allows the arm 20 be advanced within the passage way 78 relative to the locking assembly 26 in the direction of arrow 84 shown in FIG. 5.

When moved in the direction of arrow 84, the pawl 74 is pushed into the blind hole 72 by each ratchet tooth 28 passing the pawl 74. As each ratchet tooth 28 passes the pawl 74, the spring 76 urges the pawl 74 back into an annular space 86 between adjacent ratchet teeth 28. When the pawl is positioned in an annual space 86, movement of the arm 20 in a direction opposite to the direction shown by arrow 84 is blocked by the engagement of transversely-extending planar surface 88 of the pawl 74 with a portion of a planar angular surface 90 of a subject ratchet tooth 28. Thus, the spring-loaded pawl 74 permits the arm 20 to be telescoped into the locking assembly 26 while preventing the arm 20 from being separated from the locking assembly 26 when it is in its locked position. In one embodiment, the lock assembly 26 is actuated by a removable key that can be inserted into a key slot 22. In a manner known in the art, rotation of the key will rotate a torque blade and displace the pawl 74 into the blind hole 72 to compress the spring 76, and away from the passage way 78, thereby unlocking the lock assembly 26 to permit withdrawal of the arm 20 from the lock assembly 26.

Although a key actuated lock assembly 26 has been shown in the Figures, different types of lock assemblies could be used such as a combination actuated lock in place of a key actuated lock. Furthermore, a number of different types of pawl and ratchet configurations could be used, and in some embodiments a less sophisticated locking methods could be used, for example through holes could be provided along the length of the arm 20 for receiving a pad lock or a fastener such as a screw with a keyed head passed through corresponding locking holes provided in the sleeve 24. Although the locking arm 20 and sleeve 24 have been shown as cylindrical, different sliding/telescoping configurations could be used to movably connect the arm 20 and sleeve 24. Although having a configuration that allows first and second corner engagement members 12, 14 to be telescopically/slidably moved relative to each other can provide ease of mounting and allow the system 101 to be used with different sized rectangular objects, in some example embodiments the opposed first and second corner engagement members 12, 14 could be secured together by an intermediate structure that is not adjustable—for example, arms that are screwed together or to a central plate.

Figure 2A:
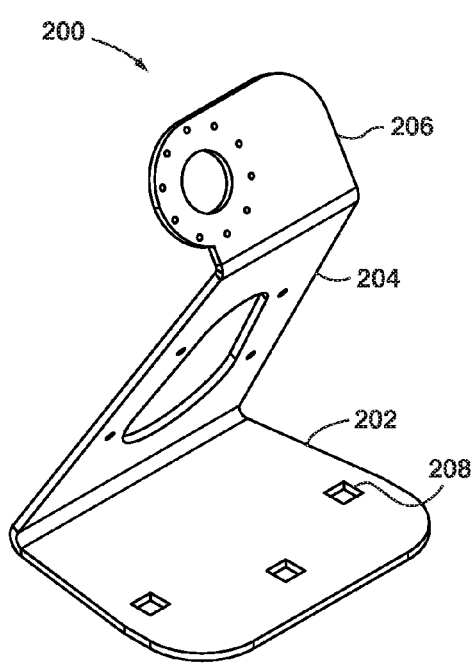
FIG. 2A is a perspective view of a stand of the security system of FIG. 1A according to an example embodiment of the invention.
Figure 2B:
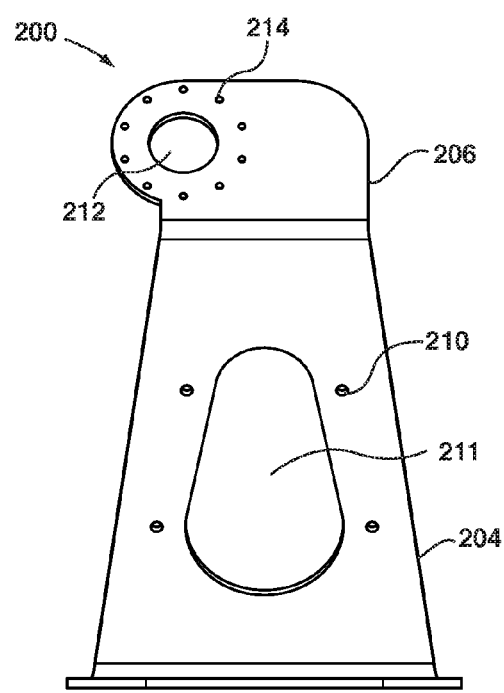
FIG. 2B is a front view of the stand of FIG. 2A.

The security system 101 also includes a rigid stand 200 that the security device 10 is attached to by pivot mechanism 300. In one embodiment, stand 200 is shaped in a 'z' configuration. For example, FIGS. 2A and 2B illustrate stand 200 with a horizontal flat plate 202, a flat portion 204 extending from one side of the horizontal flat plate 202 at an angle of 60°, and second flat portion 206 extending from the top of the flat portion 204 at an angle of 120° in a direction opposite to the flat portion 204. The 'z' configuration of the stand 200 may be formed with different angles than those described.

As shown in FIG. 2A, the horizontal flat portion 202 contains a plurality of through holes 208 for securing the stand 200 to a table or counter or other support surface. In an example embodiment as shown in FIG. 2A, there are three through holes 208. The through holes 208 may be of various sizes and shapes to accommodate multiple types of fasteners. The stand 200 may be secured to a flat surface for example using screws or a bolt and nut combination, in conjunction with the through holes 208 to secure the horizontal flat portion 202 to an upper surface of the table or other support surface. The horizontal flat portion 202 is of sufficient length and width so that it may sit on a flat surface and support the security device 10 attached to the stand 200.

In an embodiment shown in FIG. 2B, the flat portion 204 of the stand 200 comprises a plurality of through holes 210 which may be utilized for securing cable ties. The cable ties (not shown) secure cables (or cords) of the tablet device 100 that is secured in the security device 10. In the example embodiment of FIG. 2C, there are four through holes 210 positioned around an opening 211 in the central portion of the flat portion 204. The opening 211 provides an opening in the stand 200 for cables from the secured tablet device 100 to pass through. The shape and size of the through holes 210 and the opening 211 may vary.

Figure 4A:
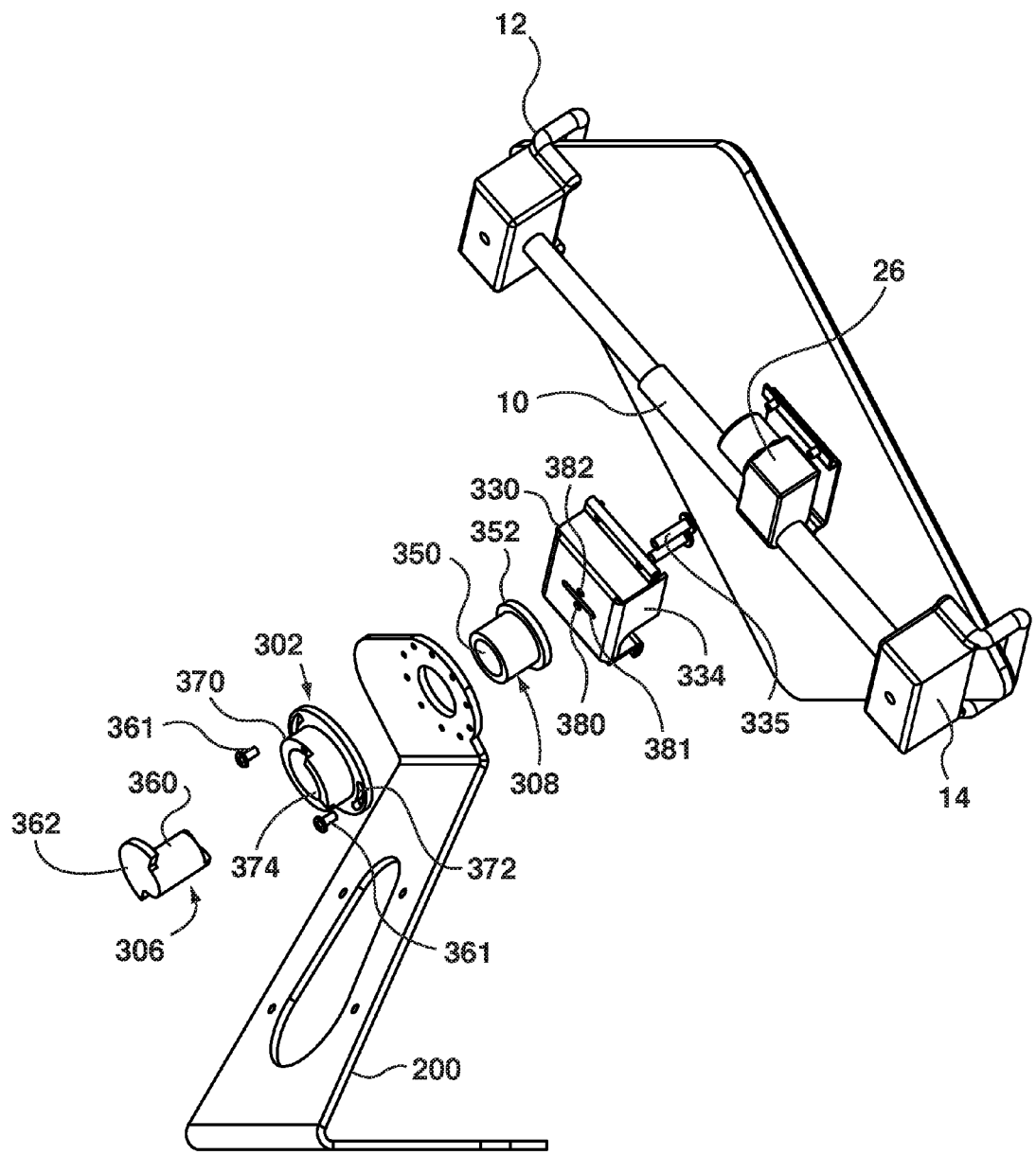
FIGS. 4A and 4B are exploded rear and front views of a security system of FIG. 1A.
Figure 4B:
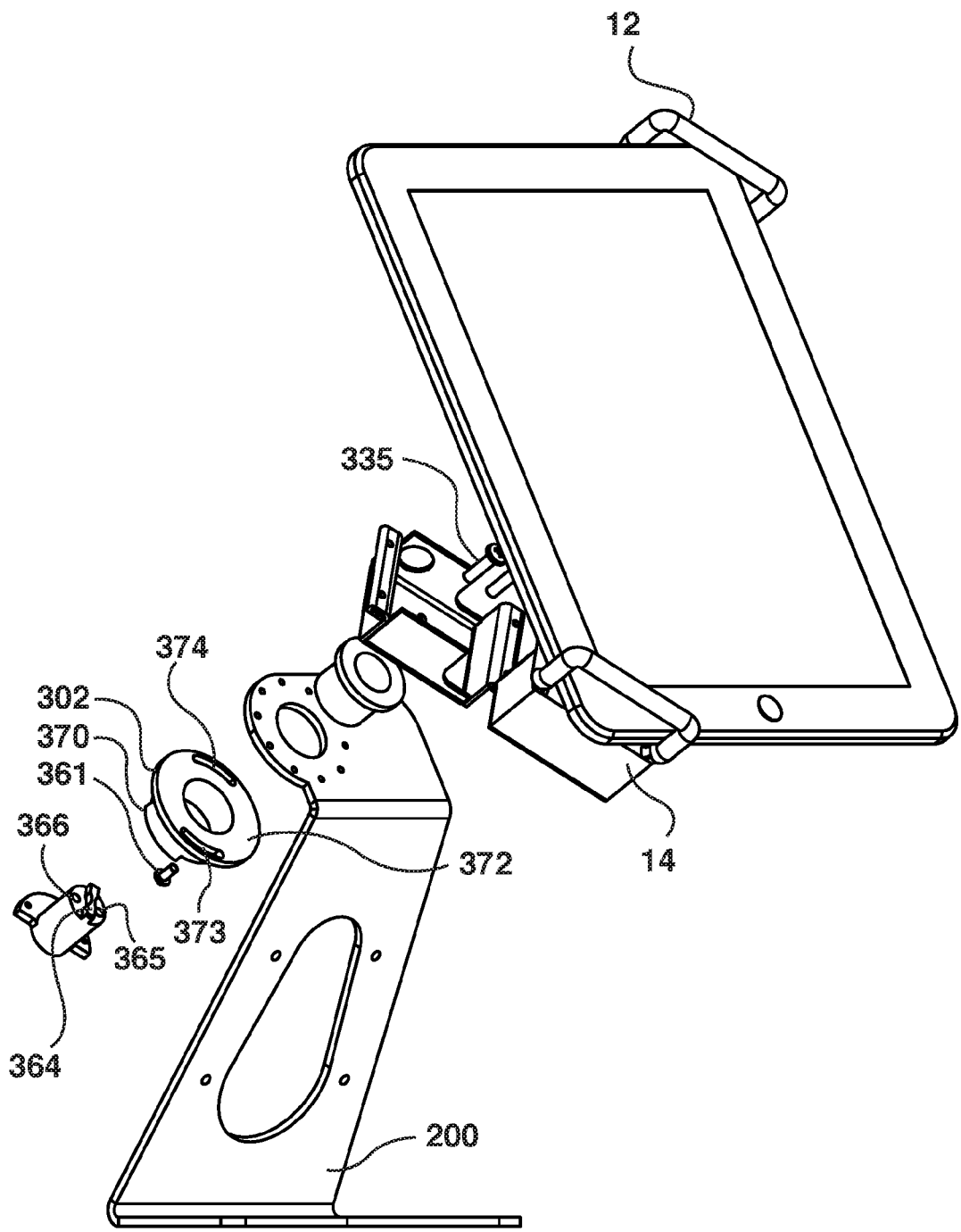

As shown in FIG. 2B, in an embodiment the second flat portion 206 of the stand 200 comprises an opening 212 as well as a plurality of through holes 214 surrounding the opening 212. As shown in FIGS. 4A and 4B, the opening 212 is circular for receiving a cylindrical part of the pivot assembly pivot assembly 300 (described below). The through holes 214 facilitate the fastening of the security device 10 to the stand 200 using the pivot assembly 300. In an example embodiment, only two opposing through holes 214 are required to fasten the pivot assembly 300 and the security device 10 to the stand 200.

Accordingly, the plurality of through holes 214 enable the pivot assembly 300 to be fastened at different positions on the stand 200.

Figure 7:
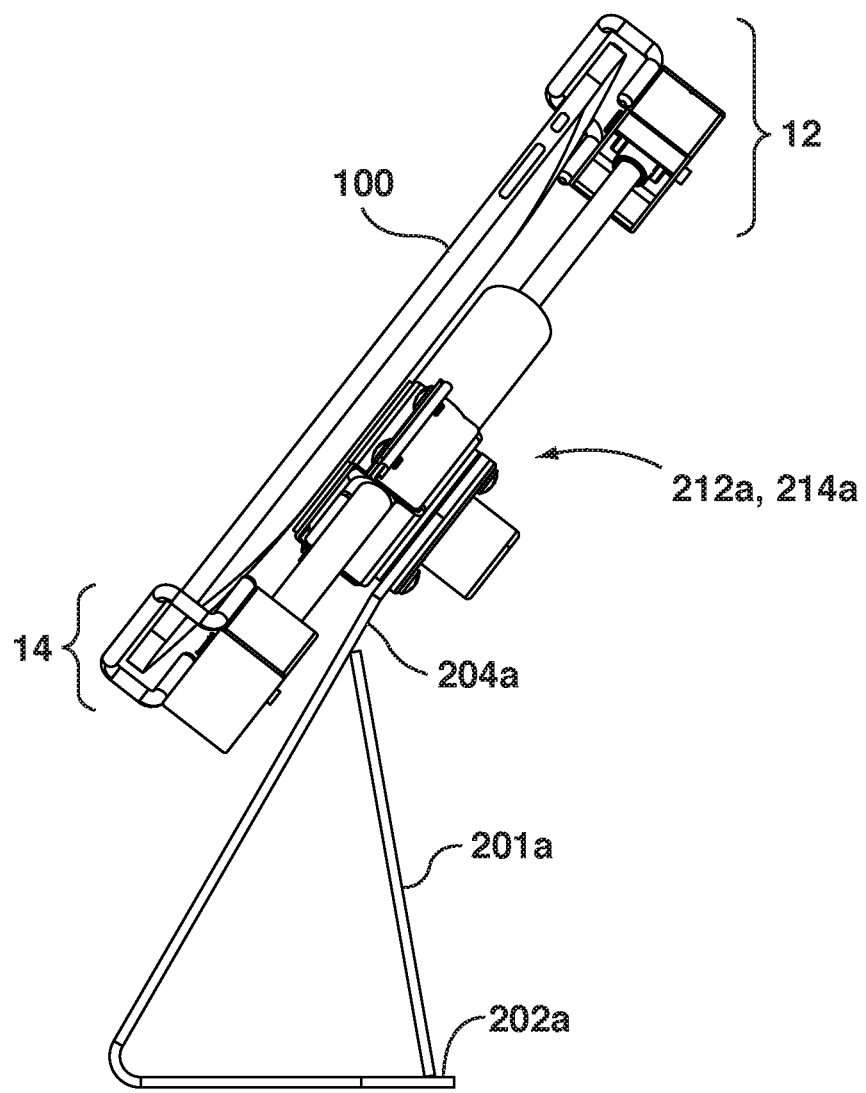
FIG. 7 is a side view of a security system according to a further example embodiment of the invention.

As well, in some embodiments as shown in FIG. 7, the stand 200a may comprise a horizontal flat plate 202a and a flat portion 204a, without a further bent plate portion 206. In this embodiment, the flat portion 204a is longer than the flat portion 204 in FIG. 2 to accommodate the security device 10 being affixed to the top of flat portion 204a. Accordingly, in this embodiment, the opening 212a and the plurality of through holes 214a are located at the top of the flat portion 204a. In some examples, the top of the flat portion 204a where opening 294a is located may be bent back at a slight angle relative to the rest of flat portion 204a to avoid interference between the lower end of the lock device 10 and the stand. In some example embodiments, a reinforcing member 201a could be connected between the flat portion 204a and the base plate 202a.

Figures 3A, 3B:
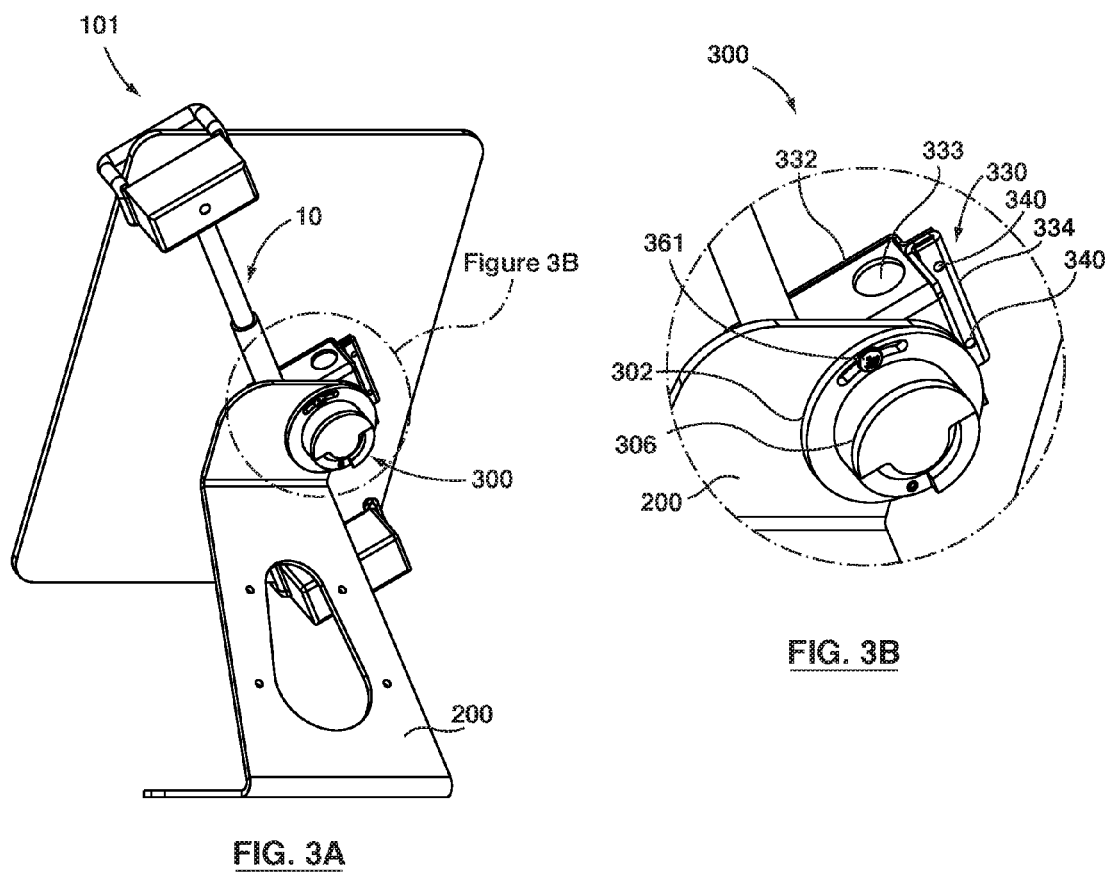
FIG. 3A is a perspective back view of the security system of FIG. 1A
FIG. 3B illustrates and enlarged portion of FIG. 3A illustrating a pivot assembly of the security system according to an example embodiment of the invention

As discussed, the security system 101 further comprises the pivot assembly 300. FIGS. 3A, 3B, 4A and 4B illustrate an example embodiment with the pivot assembly 300 for fastening together the security device 10 and the stand 200. The pivot assembly 300 includes an adjustment member 302, a cylindrical member 308 (FIG. 4A), and a second cylindrical member 306. In the illustrated embodiment, the pivot assembly 300 includes a casing 330 for containing the lock assembly 26. In one example embodiment, the casing 330 includes and front cover 332 and a back housing 334, wherein the cover 332 and the housing 334 enclose the lock assembly 26 within an internal compartment that is defined between the cover 332 and the back housing 334. In an example embodiment, the cover 332 is releasably secured with screws or other fasteners to the back housing 334. For example, FIG. 1D shows an embodiment in which four screens 341 pass through respective holes provided at four corners of the cover 332 into respective threaded holes 340 provided at the four corners of back housing 334. In the illustrated embodiment, the screws 341 are hidden behind tablet 100 when the tablet 100 is mounted to the security system 101 so that the screws 341 cannot be accessed when the security system 301 is being used to secure a tablet 100. As shown in FIG. 3B, the back housing side 334 of the casing 300 comprises an opening 333 in a side thereof to provide access to the key slot 22 of locking assembly 26.

FIGS. 4A and 4B show an exploded view of the pivot assembly 300, illustrating the relationship of the components of the pivot assembly 300, the stand 200 and the security device 10. As shown in FIG. 4A, the pivot assembly 300 comprises a cylindrical member 308, a adjustment member 302 and a second cylindrical member 306. The cylindrical member 308 comprises a hollow cylindrical section 350 with a radial flange 352 at the top end thereof. When assembled, the cylindrical section 350 fits through the opening 212 of the stand 200 up until the point of the flange 352 of the cylindrical member 308. The flange 352 acts to overhang the opening 212 of the stand 200 to engage a front surface of the stand 200 about the opening 212.

As illustrated in FIGS. 4A, the second cylindrical member 306 comprises a solid cylindrical section 360 and a semi-circular radial flange section 362 at the back or bottom of the member 306. As shown in FIG. 4B, the top or front surface of the second cylindrical member 306 further comprises two threaded recesses 365, 366 for each receiving a fastener 335, and an axial projection 364 in between the two recesses 365, 366. As seen in FIGS. 4A, 4B the adjustment member 302 comprises a hollow cylindrical section 370 and a radial flange section 372 at the front or top. The bottom of the hollow cylindrical section 370 includes a quarter circular axial projection 364. As well, the flange section 372 includes two openings 373, 375 for receiving fasteners 361 to attach the adjustment member 302 to the stand 200. Also shown in FIG. 4A is the back housing 334 of casing 330, which includes two openings 380, 382 flanking a larger opening 381 in between.

In an example assembly, the cylindrical member 308 fits through the opening of the stand 200 and the flange 352 overhangs the opening 212 of the stand 200 to engage a front surface of the stand. The top of flange section 372 of adjustment member 302 is flush against a back surface of the stand 200, and the cylindrical member 308 also fits through hollow section of the adjustment member 302. The solid cylindrical section 360 of cylindrical member 306 fits within the hollow section of cylindrical member 308. To secure the components together, the projection 364 of cylindrical member 308 fits through opening 381 of the casing 330, and screws 335 or other fasteners may be used fasten the cylindrical member 306 to the back housing 334 of the casing 330. The screws 335 pass through the openings 380, 382 of the casing 330 into the threaded recesses 365 and 366. As well, to fasten the adjustment member 302 to the stand 200, screws 361 may be used to pass from the two openings 373, 375 through the flange section 372 of the adjustment member 302, through to respective threaded through holes 214 on the stand 200. In the illustrated embodiment, openings 373 and 375 are each arcuate elongated slots so that the screw shaft can be located at different relative locations there through, allowing a degree of adjustment to be made before the fastening screws 361 are fully secured in place. Accordingly, the plurality of through holes 214 on the stand 200 and the elongate slotted openings 373, 375 provide two levels of pivot orientation adjustment for the pivot assembly 300.

An overview of the security system 101 having been provided, an explanation of the operation of the system to secure an object having opposite corners such as an electronic tablet device 100 will now be explained with reference to FIGS. 1A-1B. A tablet device 100 is shown secured to the security device 10. The tablet device 100 has a display screen on a front 102 of the device, and the back side 104 of the device is generally covered by a case of the device. As will be understood from FIGS. 1A and 1B, when securing the tablet device 100, the locking arm 20 extends behind the back 104 of the tablet device 100 with its extending end being received within the tubular sleeve 24 and lock assembly 26. The first corner engagement member 12 is telescoped or moved towards the second corner engagement member 14 until the tablet device 100 is restrained between the first restraining member 16 and second restraining member 18 as shown in FIGS. 1A and 1C.

In the engagement position, a pair of diagonally located corners of the tablet device 100 are secured between the opposed first and second corner engagement members 12 and 14. With respect to first corner engagement member 12, opposed first and second sidewall or edge engagement members 33,34 restrain movement of the tablet device 100 in a horizontal plane parallel to the surface of the tablet device by engaging a pair of the sidewalls or edges of the tablet device 100 at its corner. The front engagement member 35 functions to prevent any substantial forward movement of the tablet device 100, and the base 30 functions to prevent movement in a backward direction. Similarly, with respect to the second corner engagement member 14, first sidewall and second sidewall or edge engagement members 37, 38 engage another pair of sidewalls or edges of the tablet device 100 at an opposite corner of the device to prevent sideways movement of the tablet, and the front engagement member 39 and base 36 prevent forward and backward movement of the tablet device 100. Thus, in the engagement position, the first and second opposed corner engagement members 12 and 14 prevent unauthorized removal of the tablet device 100 from the security device 10.

For each of the cover engagement members, the respective front engagement members 35 and 39 and bases 30 and 36 are preferably spaced far enough apart to accommodate a wide range of tablet thicknesses, while at the same time not being spaced so far apart so as to allow the tablet device 100 to be rotated out of the security device 10. Similarly, the edge engagement members 33 and 37 are preferably spaced sufficiently far from their corresponding edge engagement members 34 and 38 to receive a corner of the tablet device 100, while at the same time not being spaced-apart so far as to permit the tablet device 100 to be rotated out of the security device 10. Rotation of the key to unlock the lock assembly 26 will release the pawl 74 from the ratchet teeth 28 to permit separation of the first and second corner engagement members 12 and 14 in order to release the tablet device 100.

Tablet devices 100 generally allow users to view content on the tablet device 100 in two orientations, portrait and landscape (i.e. vertical and horizontal). Portrait orientation generally refers to a position of the device wherein the height of the display screen of the device exceeds the width of the device. Landscape orientation generally refers to a position of the device where the width of the display screen of the device exceeds the height of the device. Accordingly, in an example embodiment, the pivot assembly 300 enables the security device 10 to rotate from a first position to a second position while still being securely attached to the stand 200. This allows a user to rotate a tablet device 100 between a portrait and landscape orientation, while the device is secured in the security device 10 of the security system 101.

With the assembly of components as shown in FIGS. 4A and 4B, the pivot assembly 300 allows the security device 10 to rotate between two positions or orientations. In operation, the cylindrical member 306, which is fastened to the back housing 334 of the casing 330 rotates within the cylindrical member 308. The amount of rotation of the cylindrical member 306 is limited by the interaction between the semi-circular flange section 362 of the cylindrical member 306 and the quarter circular projection 374 of the adjustment member 302. In a first position, one edge of the flange section 362 abuts one edge of the projection 374. This prevents the cylindrical member 306 from rotating any further in this direction. When the cylindrical member 306 rotates in the opposite direction, it will move to a second position, a 90 degree rotation, before the rotation is stopped by the second edge of the projection 374. As shown in FIG. 1B, the tablet device 100 is secured in a portrait orientation. In an embodiment, the user may rotate the tablet device 100 secured in the security device 10 90° about the pivot assembly 300 to a landscape orientation as shown in FIG. 1C.

The multiple fastening holes 214 allow the rotational position of the pivot assembly 300 to be adjusted relative to the stand 200, thereby allowing the orientation of the first and second positions of the security system to be adjusted to accommodate different configurations of tablet devices. In the illustrated embodiment, the adjustment screws 361 that secure the adjustment member 302 to the stand 200 can be accessed from the back of the stand, enabling the orientation of the pivot assembly to be aligned while a tablet device 100 is secured to the stand 200. As noted above, screws 335 pass through the openings 380, 382 of the casing 330 into the threaded recesses 365 and 366 of the second cylindrical member 306. This secures the pivot assembly 300 so that it cannot be removed from the stand 200 even if adjustment screws 361 are removed. As securing screws 335 can only be accessed from the front of the casing 330, removal of the pivot assembly 300 (and lock device 10) from the stand 200 is prevented when a tablet device is secured to the lock device 10.

Figure 9:
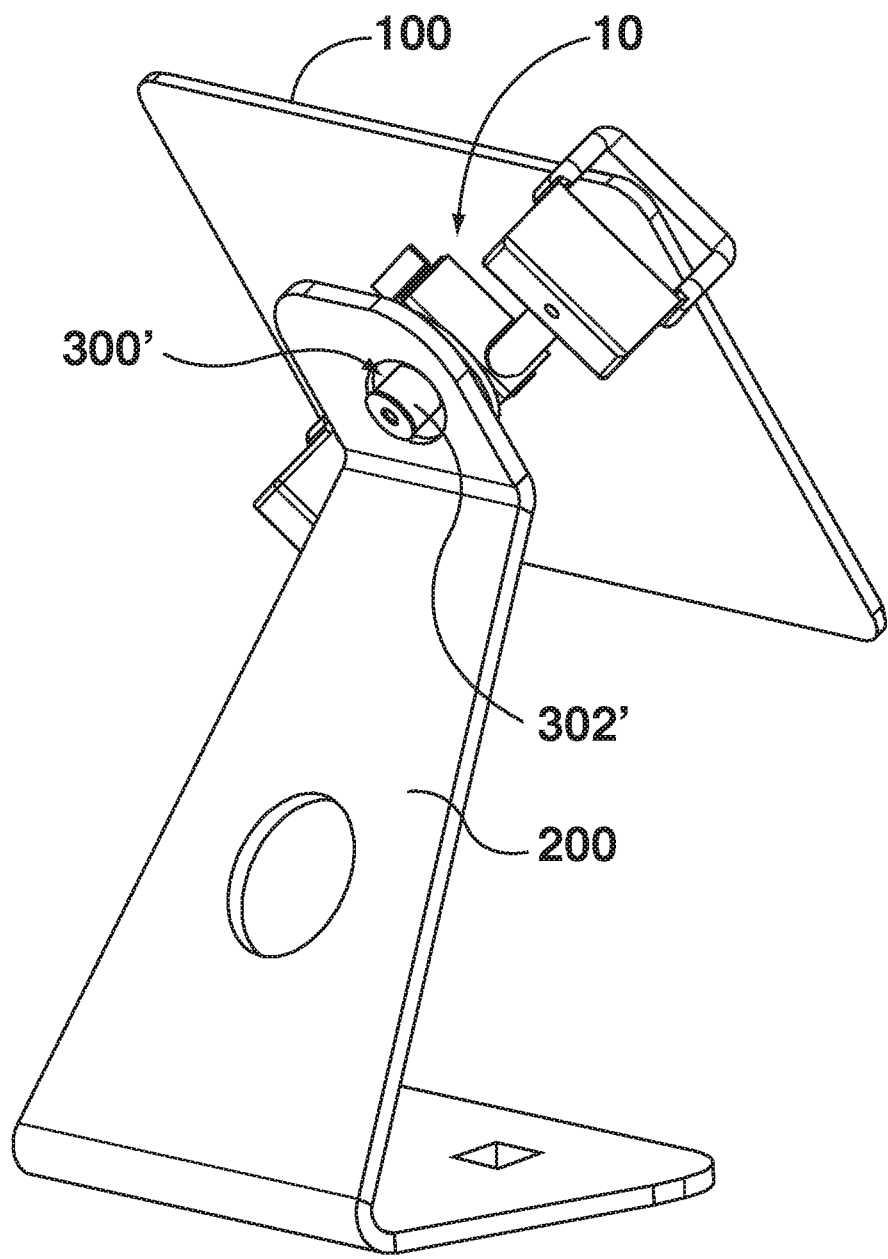
FIG. 9 is a perspective view of a security system according to a further example embodiment of the invention.

Other securing assemblies may be used to secure the stand and security device together, while also permitting the rotation of the security device. FIG. 9 illustrates an example embodiment of an alternative pivot assembly 300', which is substantially similar to pivot assembly 300 with the exception of differences that will be apparent from the Figures and the present description. Pivot assembly 300' also permits the security device 10 to rotate between a first and second orientation. In this embodiment, the pivot assembly 300' may contain a spring arrangement that facilitates the rotation of the security device 10 between a first and second orientation, and allows the security device 10 to snap in place in either orientation such that the tablet device 100 will be in a stable position in either orientation.

Figure 9A:
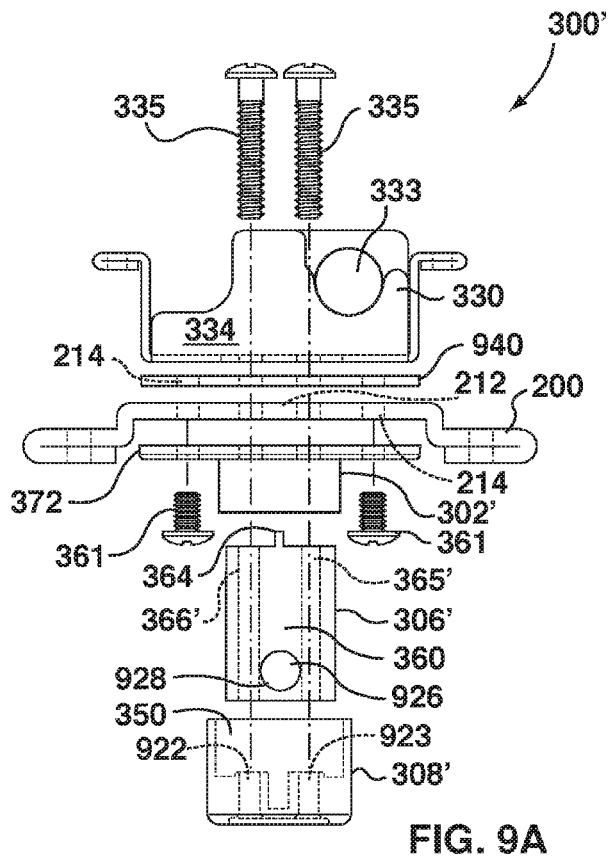
FIGS. 9A-9G are various views of components of a pivot assembly of the security system of FIG. 9
Figure 9B:
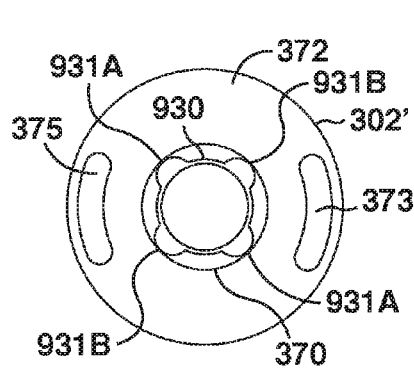
Figure 9C:
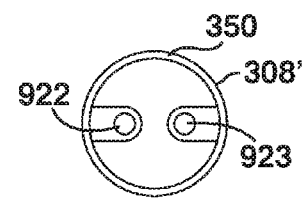
Figure 9D:
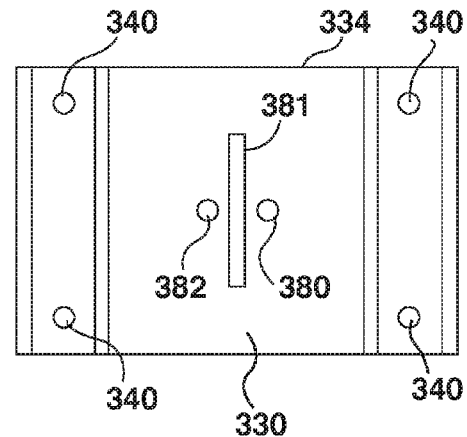
Figure 9E:
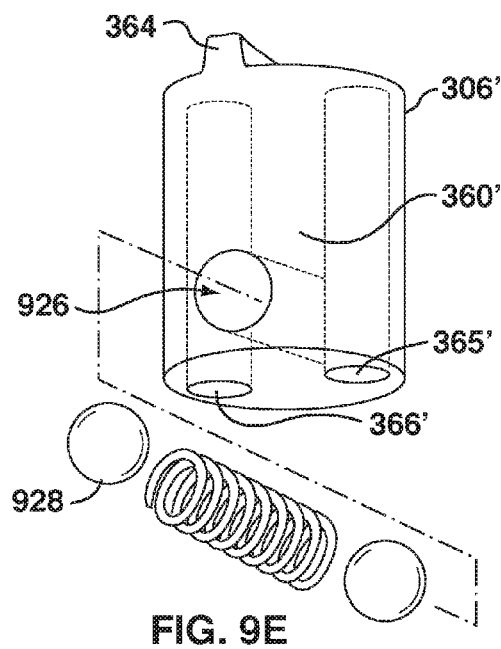

FIG. 9A shows an exploded side view of the pivot assembly 300', illustrating the relationship of the components of the pivot assembly 300' and the stand 200. As shown in FIG. 9A, the pivot assembly 300' is formed from metallic parts (although other materials could be used for some or all of the pivot assembly 300') and comprises a first cylindrical member 308', an adjustment member 302' and a second cylindrical member 306'. FIG. 9B shows a back plan view of an adjustment member 302' of the pivot assembly 300, FIG. 9C shows a front plan view of a first cylindrical member 308' and FIG. 9D shows a front plan view of the back housing 334 of casing 330. FIG. 9E shows side views of second cylindrical member 306' and a spring loaded cam follower 928.

The first cylindrical member 308' comprises a hollow cylindrical section 350 with an open front end. Two threaded screw holes 922, 923 are provided at the back end of the first cylindrical member 308'. Unlike the cylindrical member 308 of pivot assembly 300, in pivot assembly 300' the first cylindrical member 308' is located behind the stand 200 and does not extend through the stand opening 212. When assembled, the front end of cylindrical section 350 rotatably abuts against a back side of a flange 372 of the adjustment member 302.

As illustrated in FIGS. 9A and 9E, the second cylindrical member 306' comprises a solid cylindrical section 360 and a through-hole 926 that extends across its diameter. In an example embodiment a spring loaded cam follower 928 is positioned in the through-hole 926. The second cylindrical member 306' further comprises two axial passages or through holes 365', 366' for each receiving a fastener 335, and a forward axial projection 364 in between the two through holes 365, 366. As seen in FIGS. 9A, 9B the adjustment member 302 comprises a hollow cylindrical section 370 and a radial flange section 372 at the front end. As well, the flange section 372 includes two openings 373, 375 for receiving fasteners 361 to attach the adjustment member 302 to the stand 200. As seen in FIG. 9B, the inner surface 930 of the cylindrical wall 370 defines a cam surface for interacting with spring loaded cam follower 928 in the manner described below to allow the pivot mechanism 300' to rotate between two different display positions.

Also shown in FIGS. 9A and 9D is the back housing 334 of casing 330, which includes two openings 380, 382 flanking a larger slot-like opening 381 in between.

In an example assembly, the front of flange section 372 of adjustment member 302' is flush against a back surface of the stand 200, and the cylindrical wall 370 is rotatably received within first cylindrical member member 308', with the front end first cylindrical member member 308' adjacent the back surface of the flange section 372. The solid cylindrical section 360 of cylindrical member 306' nests within the cylindrical wall 370 of adjustment member 302', which in turn is received within cylindrical member 308'. To secure the components together, the projection 364 of cylindrical member 308' fits through the slot-like opening 381 of the casing 330. Screws 335 or other fasteners pass through the openings 380, 382 in the back housing 334 of the casing 330, through the through holes 366' and 365' of the second cylindrical member 306' and into the threaded openings 922 and 923 provided at the back of the first cylindrical member 308'. As well, to fasten the adjustment member 302' to the stand 200, screws 361 may be used to pass from the two openings 370, 375 through the flange section 372 of the adjustment member 302, through to the plurality of through holes 214 on the stand 200.

Figure 9F:
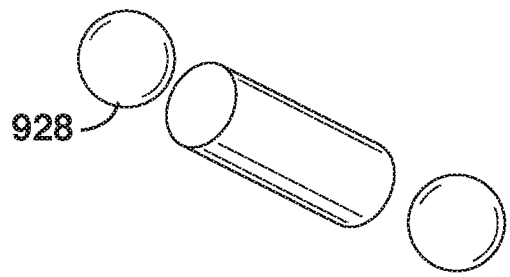
Figure 9G:
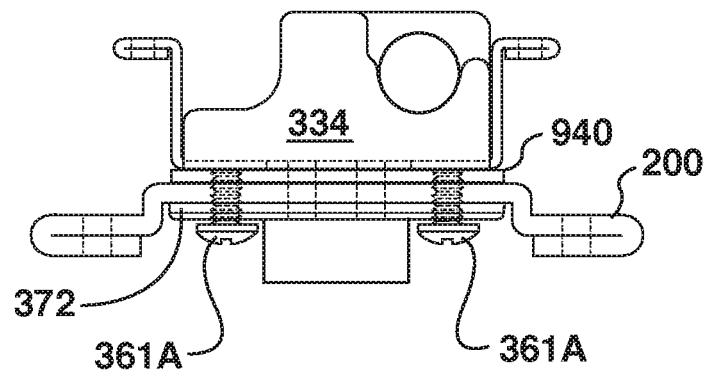

In some example embodiments, a metal washer 940, which may be spring loaded, is positioned around the stand opening 212 between the back surface of the back housing 334 and a front surface of the stand 200 in order to facilitate rotational motion of the casing 330 (and security device 10) relative to the stand 200. Accordingly, the adjustment member 302' is fixed to the stand 200 by adjustment screws 361, and the casing 330 of the pivot assembly 300 is rotatably clamped to the stand 200 by the screws 335 that extend through to the first cylindrical member 308'. The first and second cylindrical members 308', 306' and casing 330 all rotate as a unit. The rotational limits of the casing 330 are determined by the interaction of the spring loaded cam follower 928 with the inner cam surface 930 that is defined by the cylindrical wall 370 of the adjustment member 302'. In an example embodiment, the cam surface 930 interacts with the spring loaded cam follower 928 to permit the casing 330 (and a security device 10 secured thereto) to be pivoted 90 degrees between a first viewing position (for example a landscape position) and a second viewing position (for example a portrait position) for a tablet 100. In some examples the cam surface 930 includes defines two pairs of opposed index points or indentations 931A and 931B. In one of the two viewing positions, the cam follower ends are received in opposed indentations 931A, and in the other viewing position the cam follow ends are received in opposed indentations 931B. Spring loading the cam follower 928 allows the pivot assembly 300' to be biased into the first position when it is in the first position (e.g. with the cam follower projecting into indentations 931A) and to be biased into the second position when it is in the second position (e.g. projecting into indentations 931B). In some example embodiments, a curved path is provided on the cam surface wall 930 between one of the indentations 931A and its neighbouring indentation 931B (for example, the wall surface that extends clockwise from the indentation 931A located at 10:30 in FIG. 9B to indentation 931B at 1:30) and a flat surface is provided between that same indentation 931A and its other neighbouring indentation 931B (for example, the wall surface that extends counter clockwise from the indentation 931A located at 10:30 in FIG. 9B to indentation 931B at 7:30), which allows the casing 330 to be pivoted 90 degrees in one direction and then 90 degrees in the other direction, but prevents any further rotation. In some example embodiments the spring of cam follower 928 can be replaced with a solid bar to provide a display where the pivot assembly is locked in one position, as shown in FIG. 9F. It will be noted that in the embodiment of FIGS. 9A-D, if the cam follower and or cam surface become stripped the casing 330 will be able to rotate grater than the prescribed 90 degrees but the tablet will still remain locked to the security system. The number of index points used can be varied to allow more than two display positions. In another alternative embodiment, as shown in FIG. 9G, the threaded fasteners 361 that pass through openings 373, 375 of the adjustment member flange section 372 can be replaced with longer screw fasteners 361A that bite into and engage the back of casing back housing 334 thereby locking the pivot assembly in one location.

In an alternative embodiment as shown in FIG. 6A, the stand may attach to a track assembly 600. In this embodiment, the track assembly includes flat portion 602, with the two long sides each having a raised overhang sections 604, 606. The space created by the overhang sections 604, 606 may receive the sides of the stand 610. For example, the stand may slide onto the track assembly 600 through the space created between the flat portion 602 and the overhang section 604, 606, with the top of the overhang section retaining the stand 610 in place.

In the embodiment shown in FIGS. 6A and 6B, the stand 610 comprises a flat section 612, and two lower side sections 614, 615. The side sections 614, 615 are configured to fit within the space created under the overhang sections 604, 606. As well, the side sections 614, 615 each contain two through holes 616, 617 which may receive a fastener for securing the stand 610 at a position along the track assembly 600. The flat section 612 of the stand 610 comprises a plurality of through holes 620 surrounding an opening 622.

As in previous embodiments, the pivot assembly 630 comprises a securing member 632 which is attached to the stand 610 with fasteners through two of the plurality of through holes 620. In this embodiment, the pivot assembly 630 further comprises two washers 640, 641 and a cylindrical portion 650 attached to the bottom of the casing 660, the casing 660 containing the locking device 22. In this embodiment, the casing 660 attaches to the stand 610 using washers 640, 641 and with the cylindrical portion 650 passing through the opening 622 of the stand 610. When assembled, the components of the pivot assembly 630 are fastened to secure the casing 660, the securing member 632 and the stand 610 together.

Figure 6C:
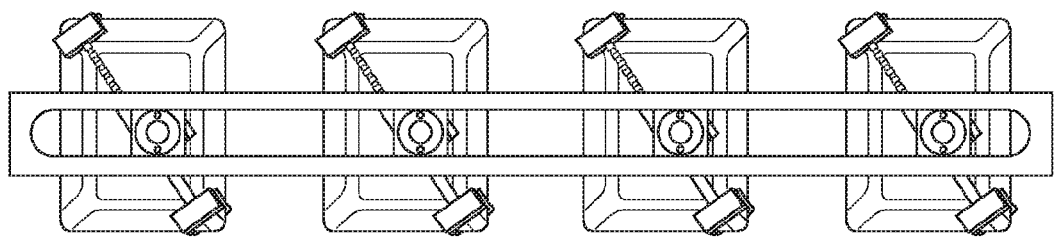
FIG. 6C is a perspective view of a security system of FIG. 6A including multiple securing assemblies.

In this embodiment, the pivot assembly 630 also allows the security device to be rotated between two different orientations. Further, the plurality of through holes 620 on the stand 610 allow the securing member 632 to be attached to the stand 610 in various positions so that the orientation of the two viewing positions can be adjusted. As well, the stand 610 may be positioned at various points along the track assembly 600. The track assembly also may accommodate more than one stand 610 allowing multiple tablet devices 100 to be secured using a single track assembly 600, as shown in FIG. 6C.

Figure 8:
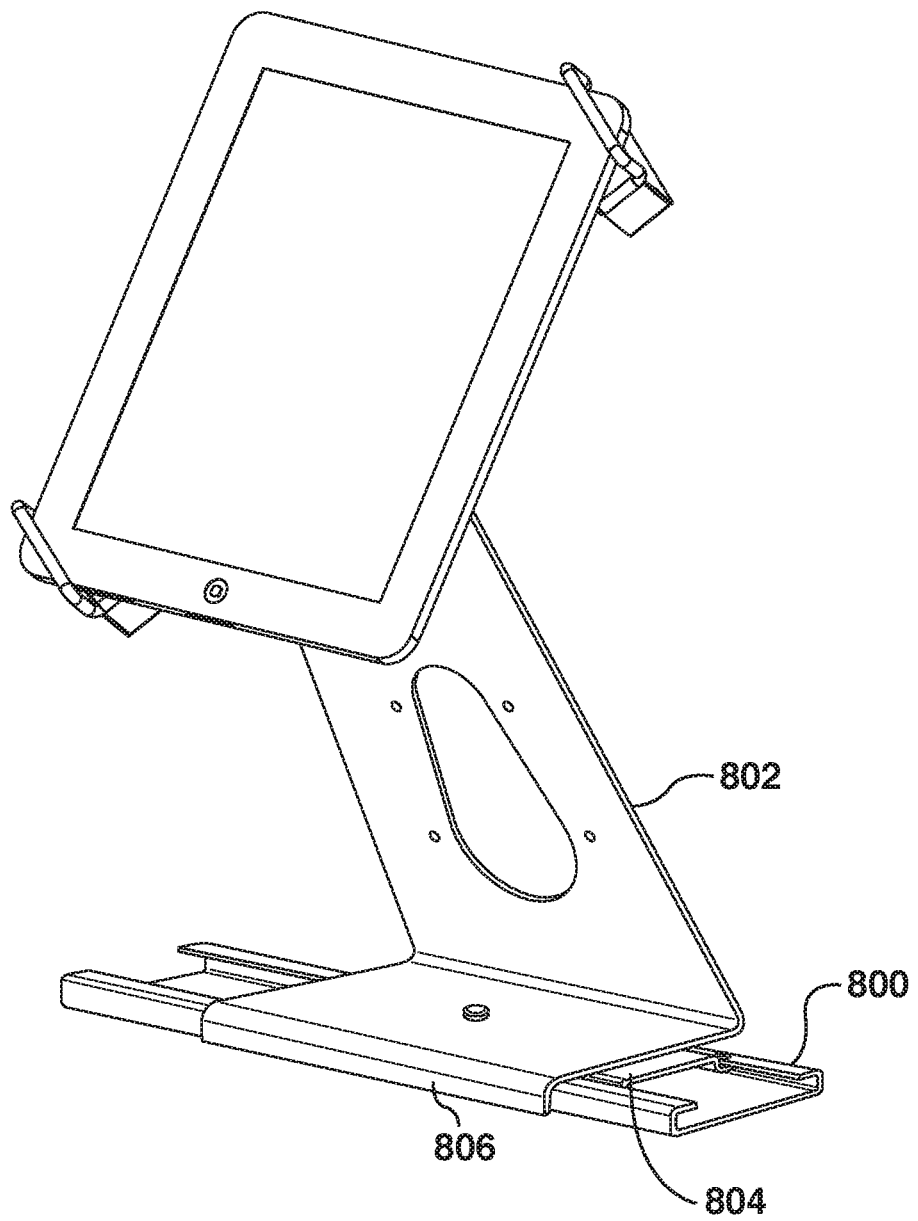
FIG. 8 is a perspective view of a security system according to a further example embodiment of the invention.

In one embodiment, as shown in FIG. 8, stand 802 slides on track assembly 800. Stand 802 is similar to stand 200 from FIG. 2, however the bottom flat portion 804 of the stand has an overhang section 806. The overhang 806 allows the stand 802 to engage the raised overhang portion 802 of the track assembly 800. In some example embodiments, the stand 802 could be integrated into the pivot mechanism such that the pivot mechanism could be secured directly to the track.

Figure 10:
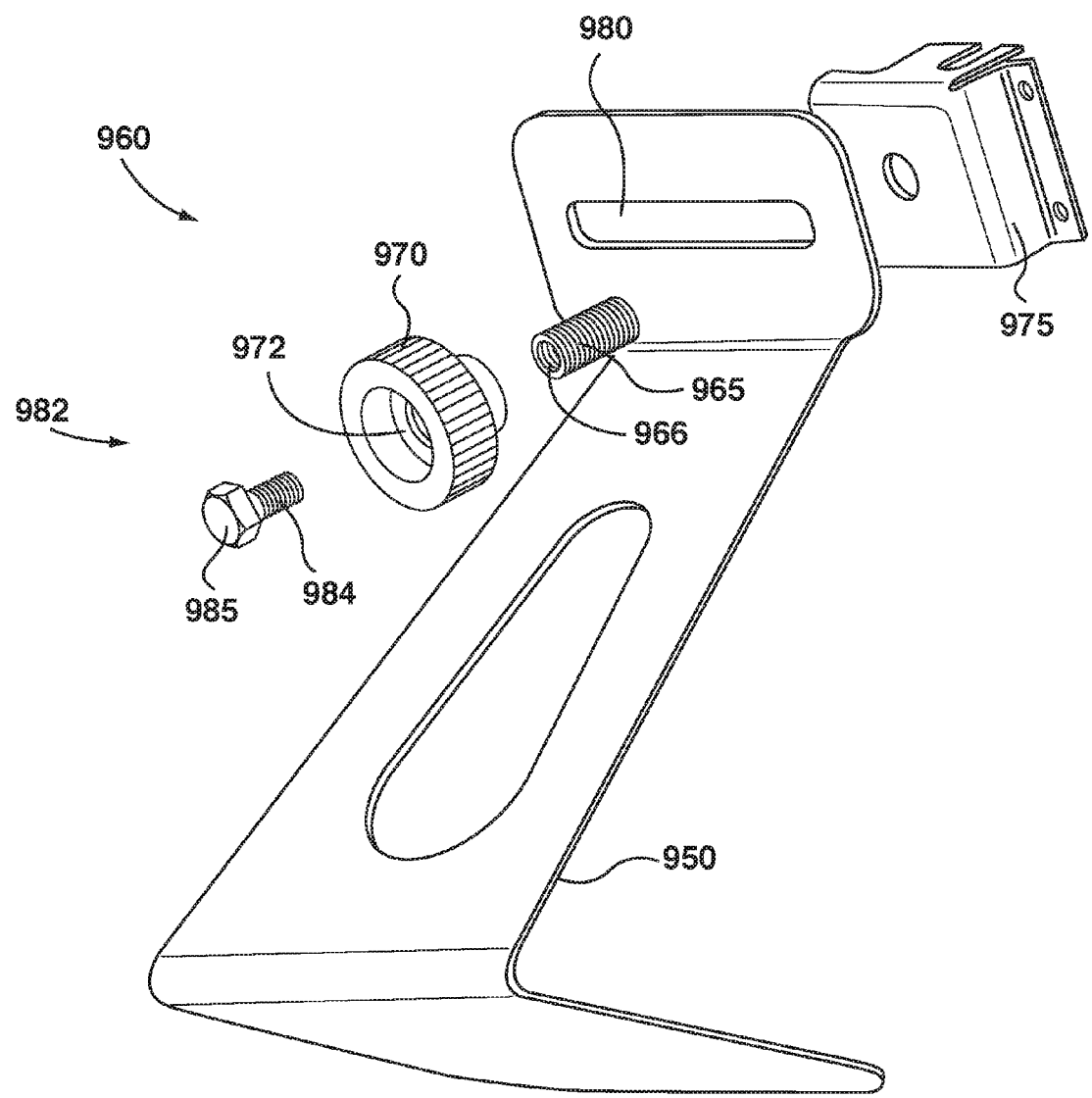
FIG. 10 is an exploded view of a security system according to a further example embodiment of the invention.

In another aspect of the application, there is provided a security system in which a screw knob is used to fix the pivot assembly in place. In this regard, as shown in FIG. 10, there is provided a stand 950 in a 'z' configuration as previously presented. The pivot assembly 960 comprises a threaded rod 965 and a knob 970. The threaded rod 965 includes a threaded recess 966. The knob 970 comprises a threaded opening 972 for receiving the rod 965. The rod 965 passes through the opening of casing 975 and through the opening 980 of the stand 950. The knob 970 is screwed onto the rod 965. A cap 982, which includes a threaded cylindrical section 984 and a lip section 985 at the top of the cap 982, is screwed into the threaded recess 966 of the rod 965. This arrangement secures the pivot assembly device to the stand in one position when the knob 970 is tightened. In the embodiment shown, the opening 980 of the stand 950 is sufficiently long to allow the casing 975 to be attached to the stand at different positions.

In some example embodiments a cable 99 (see FIG. 1D) can be secured to the lock device 10 or other component of the system 101 to provide further security.

Although the pivot assembly has been described above as permitting rotation between two discrete positions, additional positions could be facilitated. Furthermore, although the security device described above secured two opposite corners of a tablet device, a security device that secured all four corners could also be employed, or that secured the tablet device by securing all four edges, or at other contact points.

Figure 11:
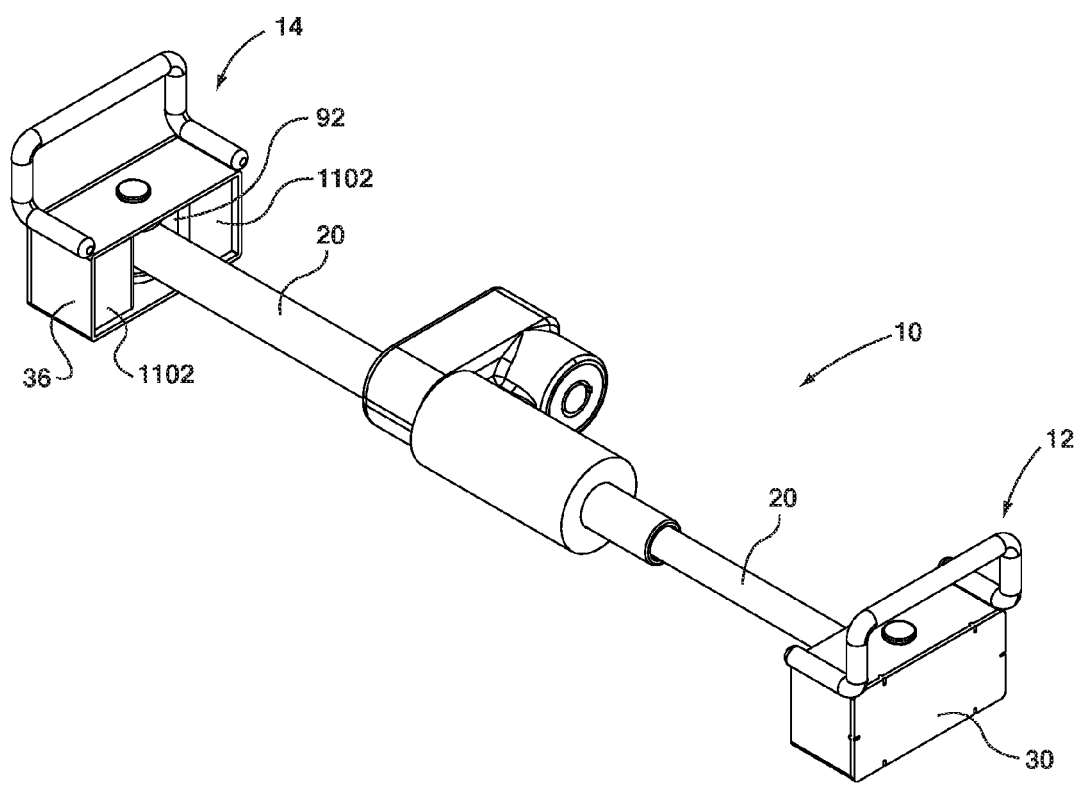
FIG. 11 is a perspective view of an example embodiment of a security device of the security system of FIGS. 1A and 1B.

FIG. 11 is another perspective view of a security device 10 according to an example embodiment. The device 10 of FIG. 11 is substantially identical to the security device 10 described above. In the device 10 of FIG. 11, the slot or receptacle 92 within the base members 30, 36 is defined on two sides by welded angle iron pieces 1102. It will be appreciated that a wide variety of core security devices 10 could be combined with the pivot assembly 300/300', including security devices of different sizes and with different configurations for securing a tablet or electronic device. Furthermore, the core security device 10 could be used without the pivot assembly 300/300' and secured by a cable.

Figure 12:
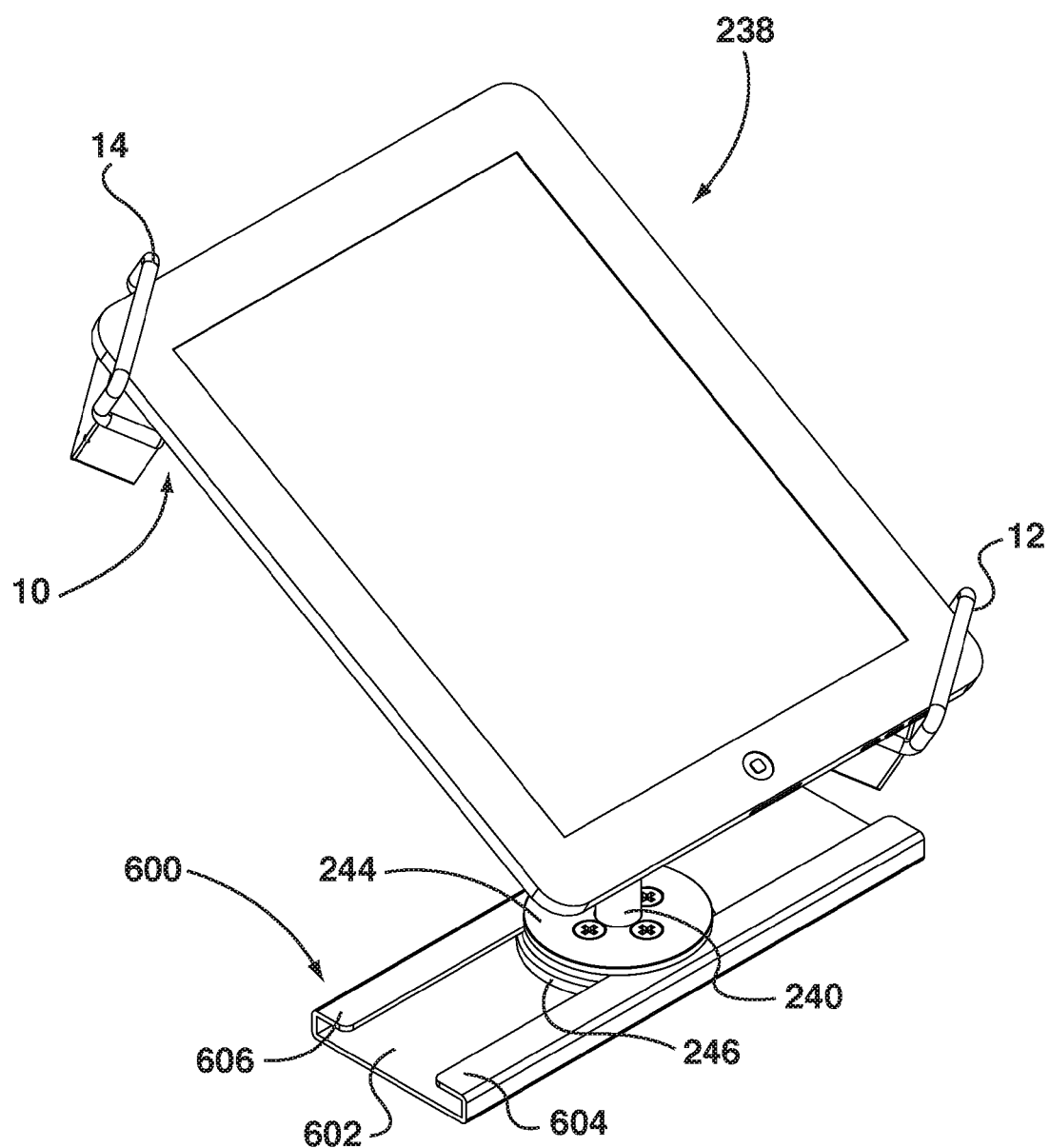
FIG. 12 is a perspective view of a horizontally mounted security system according to another example embodiment.
Figure 13:
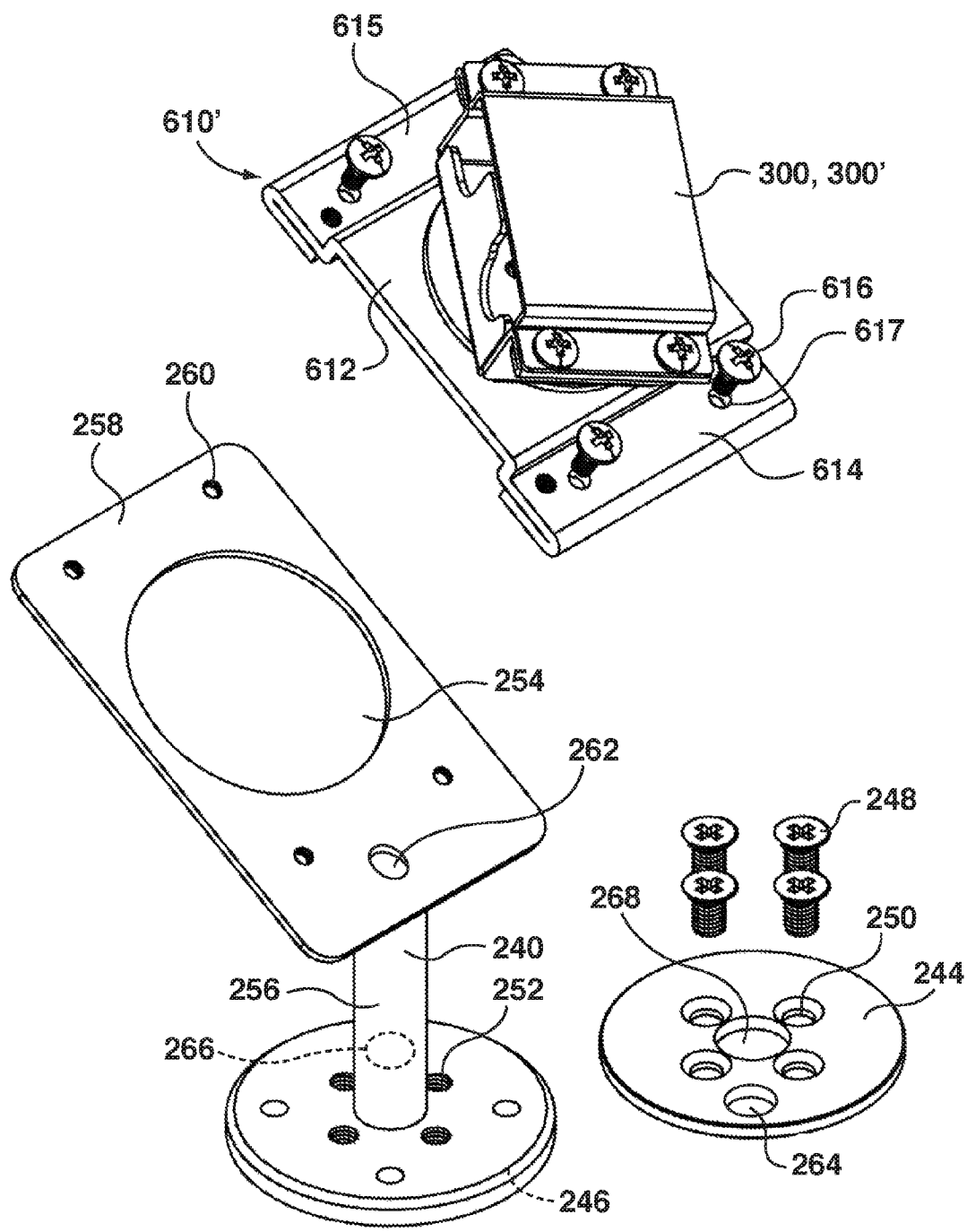
FIG. 13 is a perspective view of components of the security system of FIG. 12.
Figure 14:
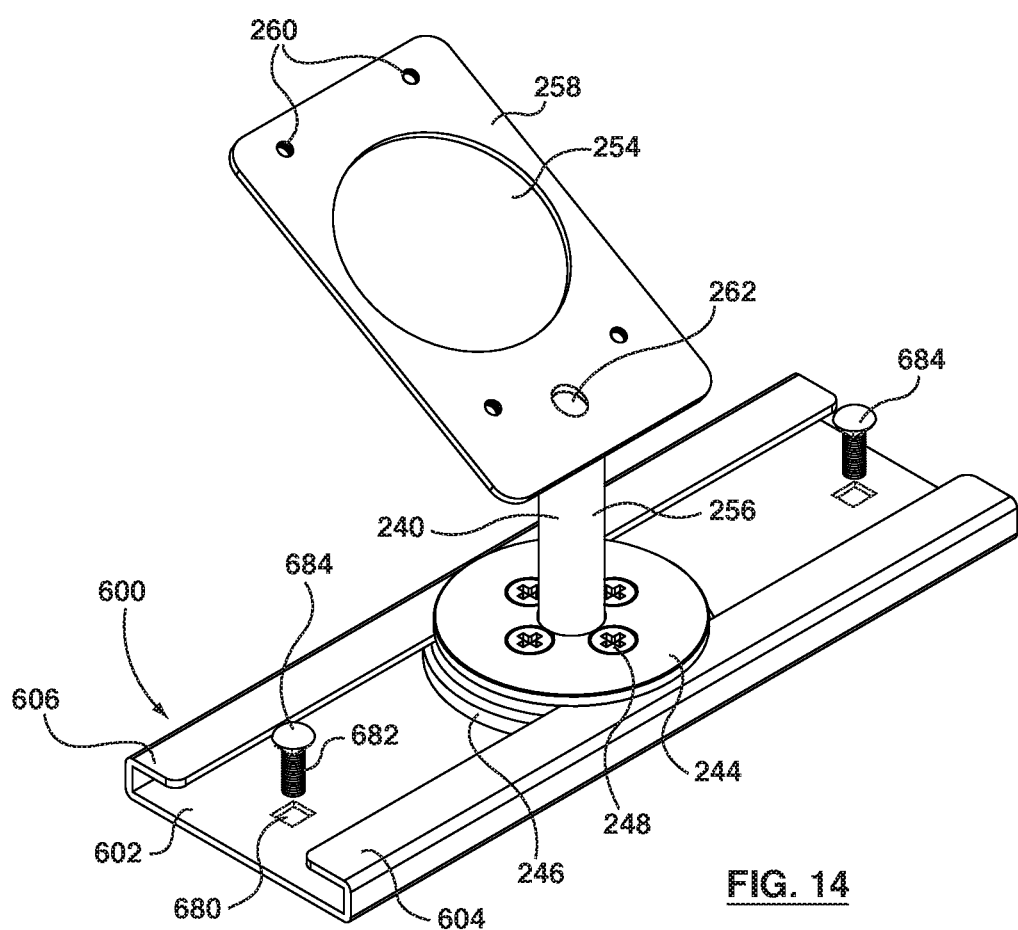
FIG. 14 is a perspective view of a stand and track of the security system of FIG. 12.
Figure 15:
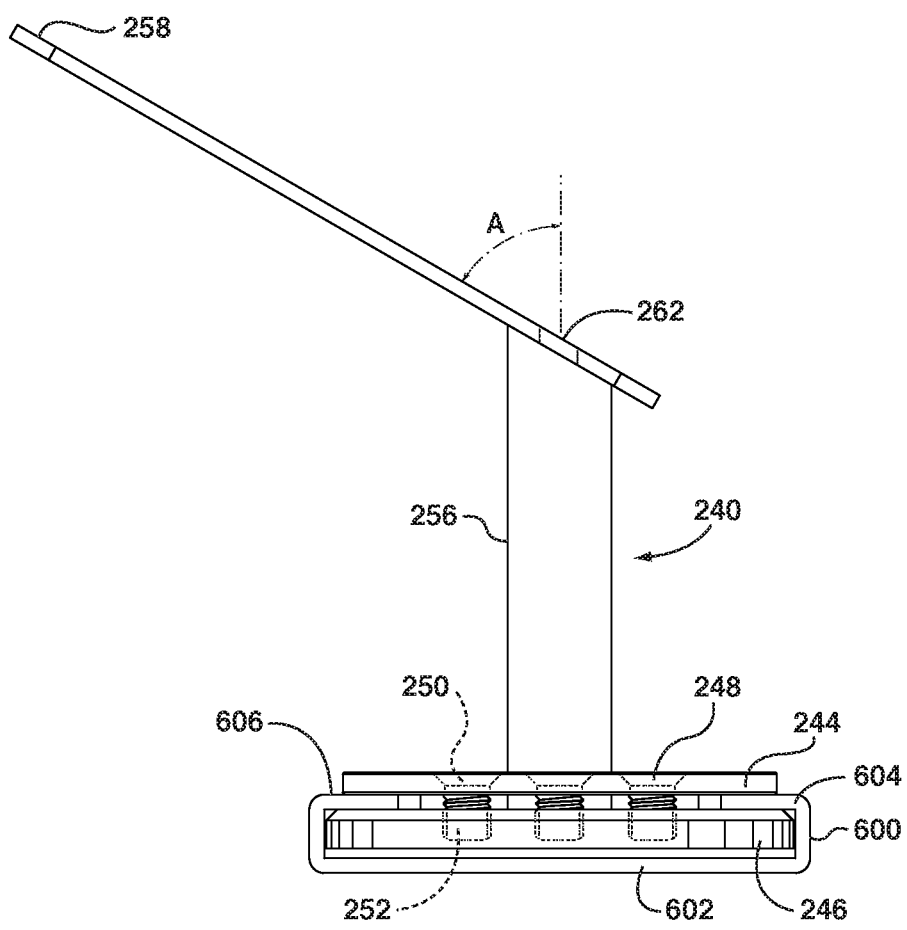
FIG. 15 is a side, partial sectional view, of a stand and track of the security system of FIG. 12.

FIGS. 12-18 illustrates another track mounted securing system 238 according to another alternative embodiment. As shown in FIG. 12, system 238 includes a support stand 240 slidably mounted to track 200, with security device 10 mounted to stand 240 to rotate between landscape and portrait positions. FIGS. 13-15 illustrate the components of the security system 238 (without the security device 10). As seen in FIG. 13, in one example embodiment, the pivot assembly 300/300' is mounted by an intermediate stand or mounting bracket 610' to the stand 240. The mounting bracket 610' is substantially similar to the stand 610 shown in FIG. 6B with one difference being that the planar side mounting sections 614, 615 are configured to mate with an upper surface of the stand 240. Referring briefly to FIG. 6B, as with stand 610, the mounting bracket 610' also includes through holes 620 surrounding central opening 622, allowing the pivot assembly 300 or 300' to be secured to the mounting bracket 610' in a variety of adjustable orientations in order to adjust the alignment of a mounted tablet or other electronic device as it is pivoted between portrait or landscape or other orientations.

Referring again to FIG. 13-15, in an example embodiment the stand 240 comprises a plate member 258 secured to one end of an elongate post member 256, with a circular base disc 246 secured to the opposite end of the post member 256. In the illustrated embodiment, as best seen in FIG. 15, the plate member 256 is tilted at an angle A degrees relative to the elongate axis of post member 256, where A is greater than 5 degrees and less than 90 degrees. In FIG. 15, A is between 55 and 60 degrees, although other suitable angles can be used. As indicated in FIG. 13, the post member 256 may be hollow and communicate with an opening 262 in the plate member 258 to permit a cable such as a power cord to pass therethrough. A corresponding axial cable opening may be provided on the underside of base disc 246 (not shown), and/or a radial opening 266 could be provided closer to the base end of the post member 258. Plate member 258 includes four holes (which could be threaded) for receiving mounting plate fasteners or screws 616, and a central opening 254 for receiving the back of pivot assembly 300/300'. It will be appreciated from FIG. 12 that once an equipment component is secured to the security system 238 the screws 616 are hidden from view and access so they cannot be removed.

The stand 240 also includes a circular floating disc-like clamp plate 244 that includes a central opening 268. Although the clamp plate 244 is shown independently in FIG. 13, as will be apparent from FIGS. 12, 14 and 15 the clamp plate 244 is slidably received on the tubular post member 256 between the base disc 246 and the upper plate member 258. A number of openings 240 are provided through the clamp plate 244 for receiving fasteners such as threaded screws 248 that can be secured to openings such as threaded holes 252 that are provided in the base disc 246. Referring to FIGS. 13 and 14, the base disc 246 has a diameter close to the width of track 600 such that the bas disk can be received within the track 600 with peripheral portions of the base disc 246 located between the track overhang sections 604 and 606 and the track flat portion 206. Once the stand 240 is slid onto the track 600 it cannot be removed without sliding it off of one of the ends of the tracks. As indicated in FIG. 14, in one example embodiment, the track 600 includes fastening holes 680 through which fasteners 682 can pass for fastening the track 600 to a support surface. Once fasteners 682 are in place, their enlarged heads 684 protrude into the run of track 600 to act as stop members thereby preventing the base disc 246 from sliding out of the track.

Clamp plate 244 allows the stand 240 to be releasably secured in a selected position on the track 600—in particular, as can be seen in FIGS. 14 and 15, the clamp plate 244 diameter is large enough that that peripheral portions of the clamp plate 244 extend over the track overhang sections 604 and 606. When the fasteners 248 are screwed in place, the overhang sections 604 and 606 are clamped between the clamp plate 244 and disc base 246, preventing the stand 240 from being rotated within or slid along the track 600. Loosening screws 248 allows the stand 240 to be rotated about its post axis or slid along the track to a new position, after which the screws 248 can be re-tightened.

Figure 16:
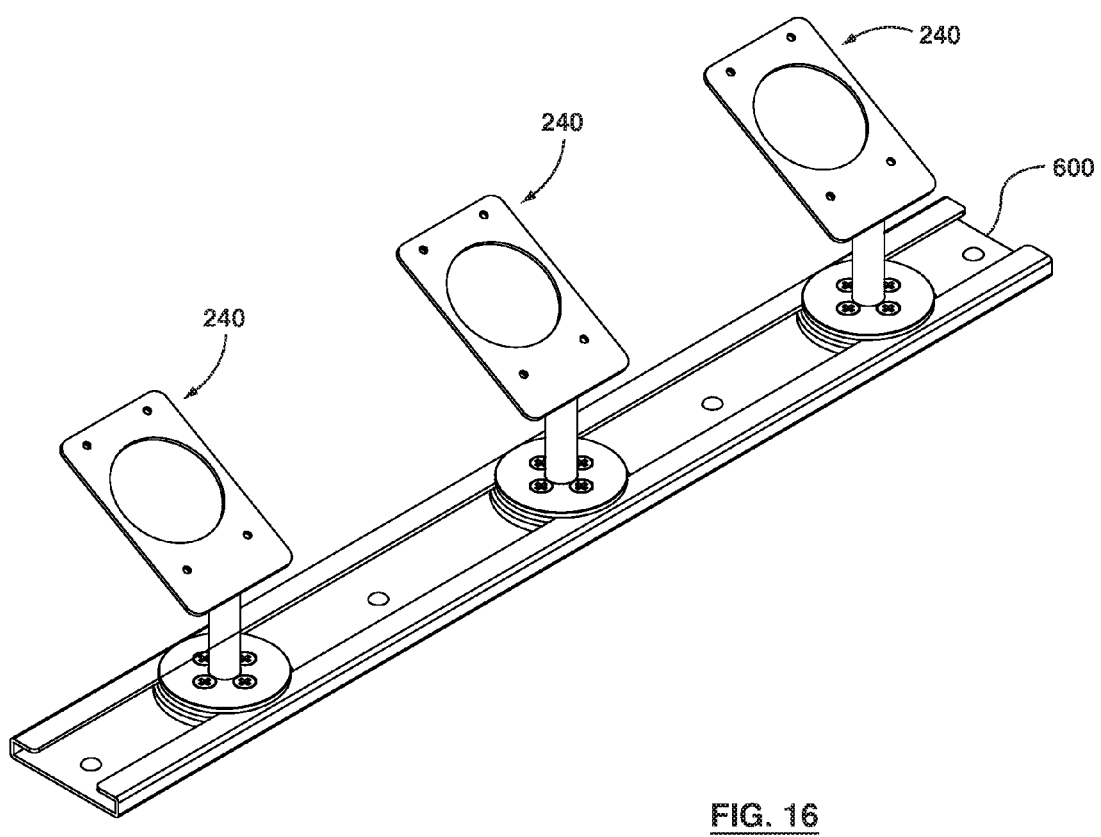
FIG. 16 is a perspective view of a multi-unit stand and track assembly of the security system of FIG. 12.

Referring to FIG. 13, in some embodiments clamp plate 244 could be omitted and screws 248 could be screwed into and through the threaded holes 252 in disc base 246 to contact the flat bottom 602 of the track 600 to secure the stand 256 in place. Many other configurations for securing the stand in place are also possible. Furthermore, in some embodiments, the stand 256 could be secured directly to a support surface without the track 600. A through hole 264 through clamp plate 244 and corresponding hole through the disc base 246 could be provided to receive and additional fastener for securing the stand 240 to a surface. FIG. 16 shows multiple stands 240 received in a track 600, and FIGS. 17 and 18 respectively show track-mount security systems 238 for securing a single device or a plurality of devices, for example in a retail location.

Figures 17, 18:
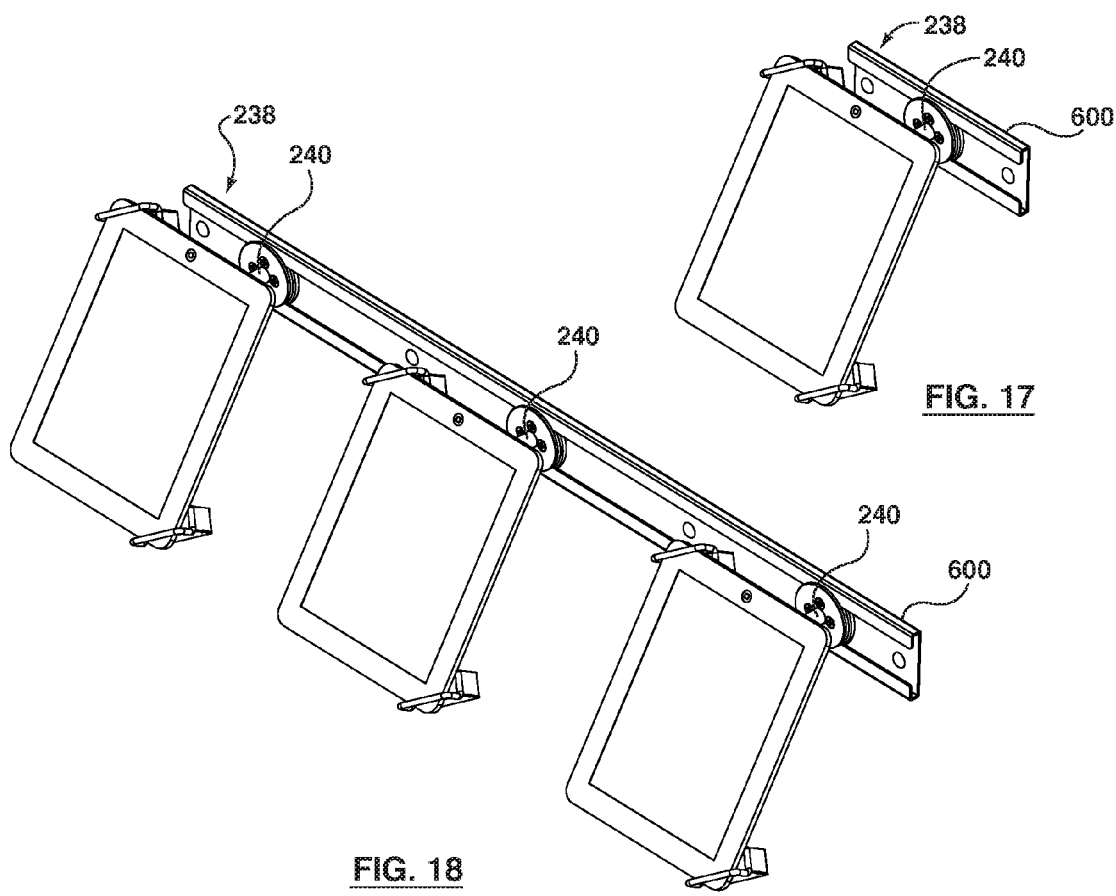
FIG. 17 is a further perspective view of the security system of FIG. 12.
FIG. 18 is a perspective view of a multi-unit version of the security system of FIG. 12.

The track 600 in system 238 can be mounted against a vertical support surface with its elongate axis horizontal (as shown in FIG. 18), or with its elongate axis vertical, or at titled at an angle, or, as shown in FIG. 15, on a horizontal support surface. The ability of the stand 240 to be rotated in the track 600 allows the system 238 to be flexibly set up and adds another level of adjustability beyond the multiple holes 620 provided on the mounting plate 610' to allow the track location and orientation to be adjusted.

Figure 19:
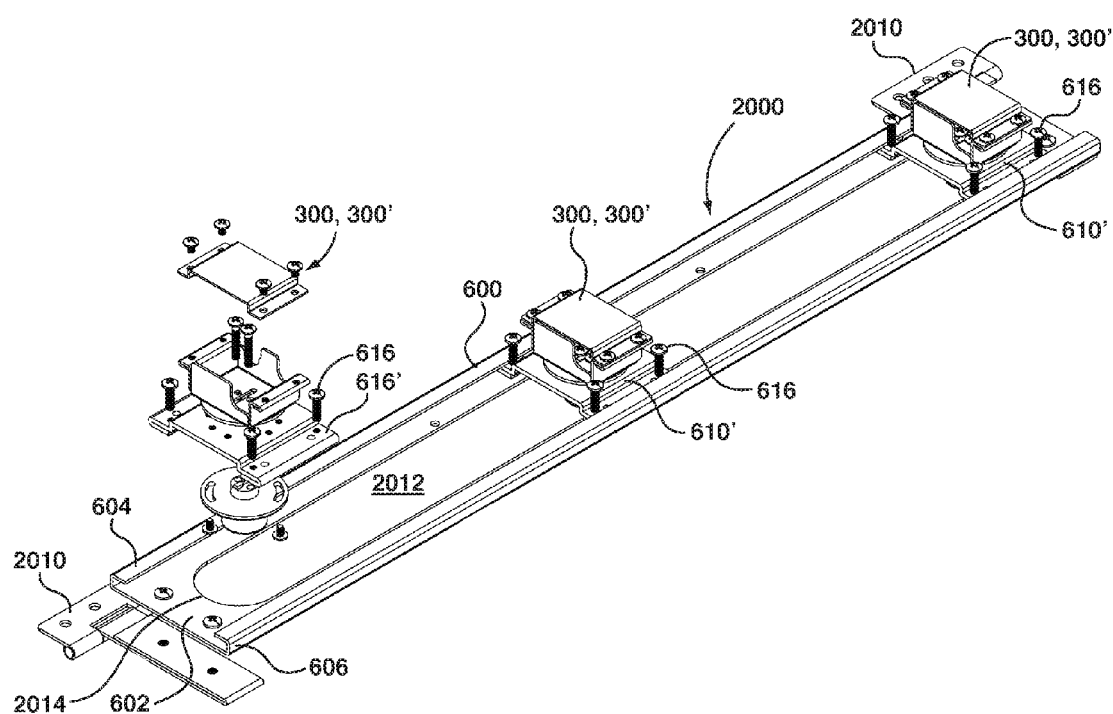
FIG. 19 is a perspective view of a pivot assembly and track for use in a multi-unit security system according to a further example embodiment.
Figure 20:
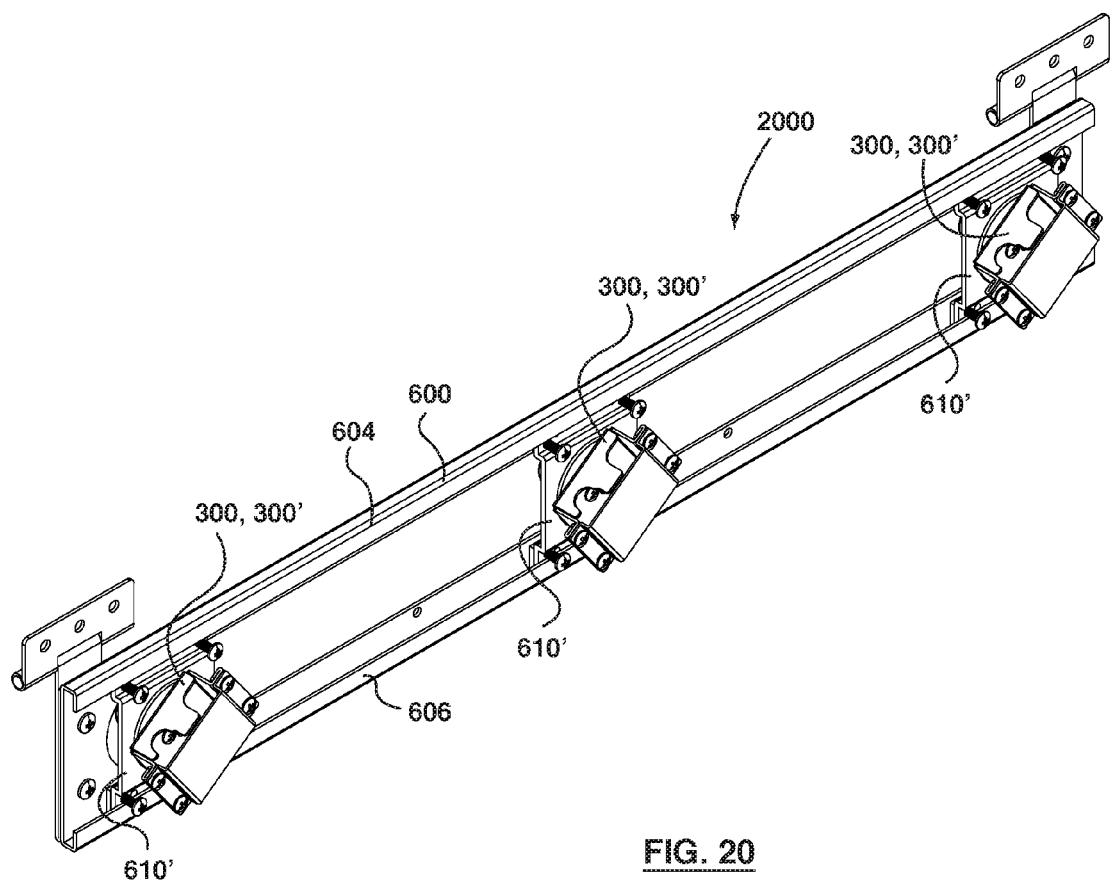
FIG. 20 is a front perspective view of the pivot assembly and track of FIG. 19.
Figure 21:
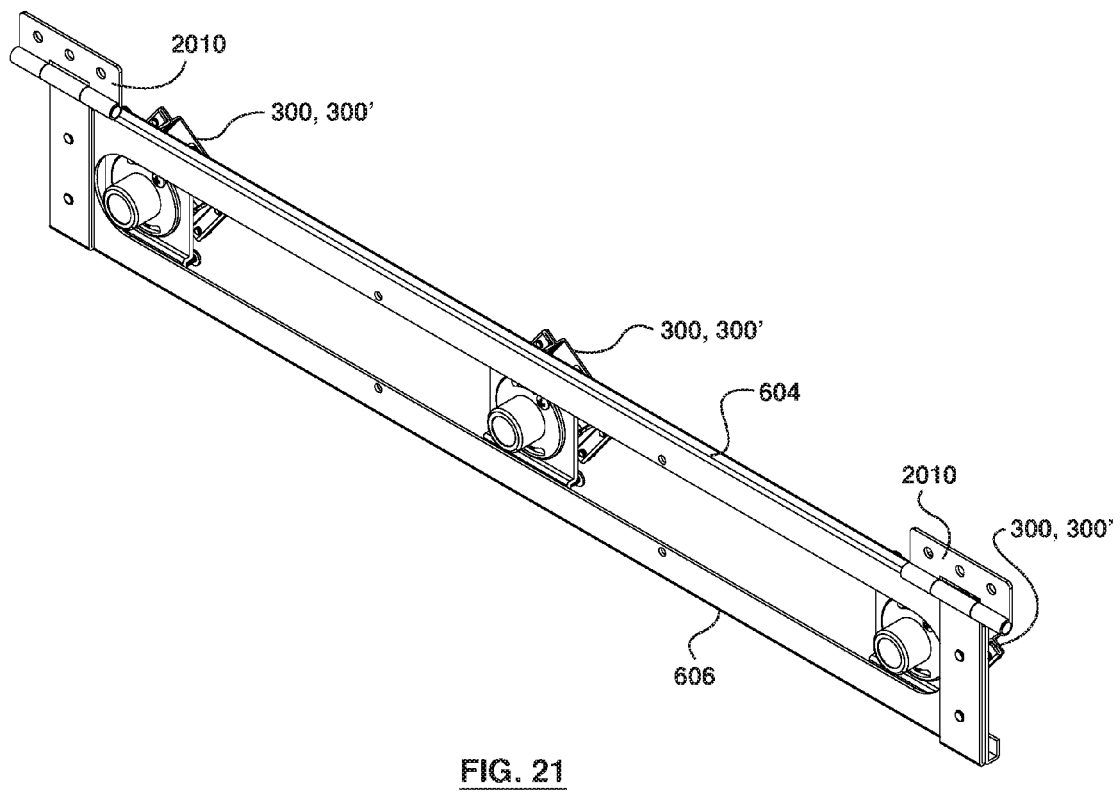
FIG. 21 is a back perspective view of the pivot assembly and track of FIG. 19.
Figure 22A:
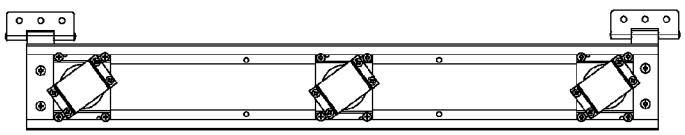
FIGS. 22A, 22B and 22C are front views of the pivot assembly and track of FIG. 19, showing different installation orientations.
Figure 22B:
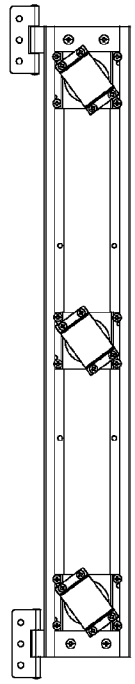
Figure 22C:
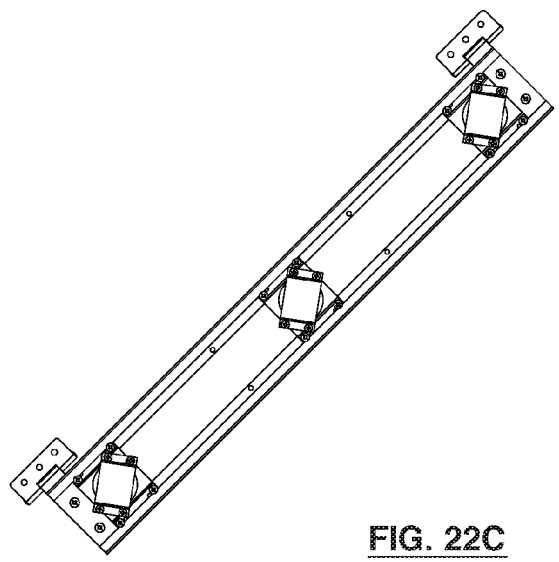
Figure 23:
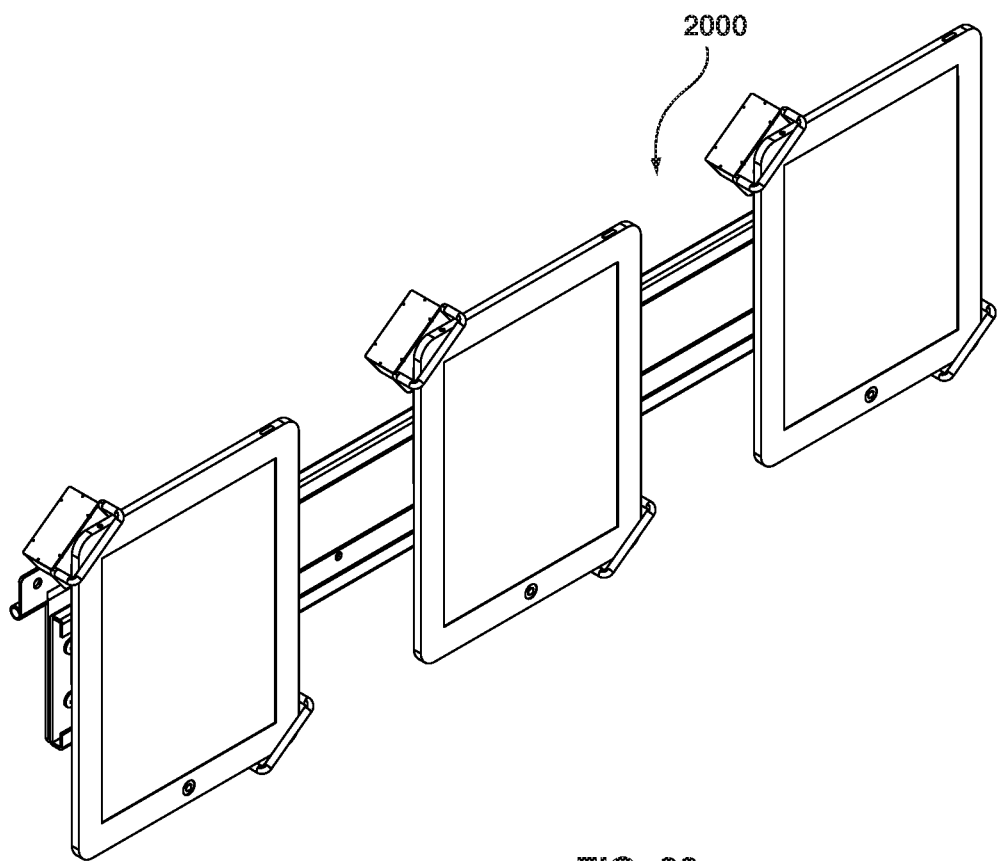
FIG. 23 is a perspective view of a multi-unit security system using the pivot assembly and track of FIG. 19 and securing tablet style electronic devices.

FIGS. 19-23 illustrate yet another track-style security system 2000 which is similar to the system described in respect of FIGS. 6A and 6B. FIGS. 19 and 20 show a front perspective view of security system 2000 in a vertical mount and horizontal mount orientations (without showing respective security devices 10). Mounting stands or plates 610, 610' are each used to secure a respective pivot assembly 300,300' to the track 600. As seen in FIG. 19, the track includes an elongate central opening 2012 through central plate area 692 for accommodating cables as well as the backward extending portions of pivot assemblies 300/300'. Once a mounting plate 610, 610' is slid on the track 600 and then a pivot assembly 300, 300' mounted thereto, the ends of the elongate central opening 2012 acts as stops to prevent the pivot assembly/mounting brackets from being slid off the track 600. Screws 616 can be used to secure each mounting bracket in a desired location. The system 2000 varies from that shown in FIGS. 6A and 6B in that mounting hinges 2010 are provided on the track 600 to allow the track 600 to be pivoted outward from the surface that it is mounted on to allow access to and adjustment of the back of pivot assemblies 300, 300. FIG. 21 shows a back perspective view of system 2000, and FIGS. 22A-22C show various vertical mount orientations. FIG. 23 shows a row of devices secured for display by a security system 2000.

Figures 24, 25:
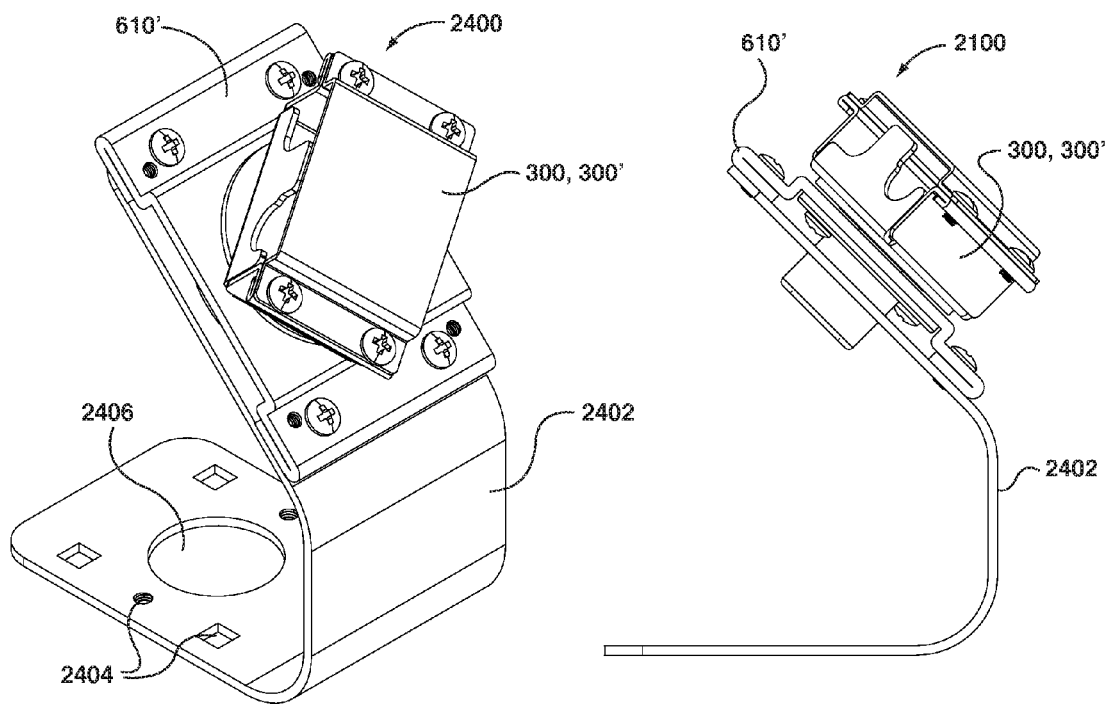
FIG. 24 is a front perspective view of pivot assembly and stand for use in a security system according to a further example embodiment.
FIG. 25 is a side view of the pivot assembly and stand of FIG. 24.

FIGS. 24 and 25 show another example of a security system 2400 in which pivot assembly 300/300' is secured by using an intermediate mounting stand or bracket 610 or 610' to a further display stand 2402. Display stand 2402 can include a cable opening 2406 and one or more securing openings 2406 on a base thereof.

Figure 26:
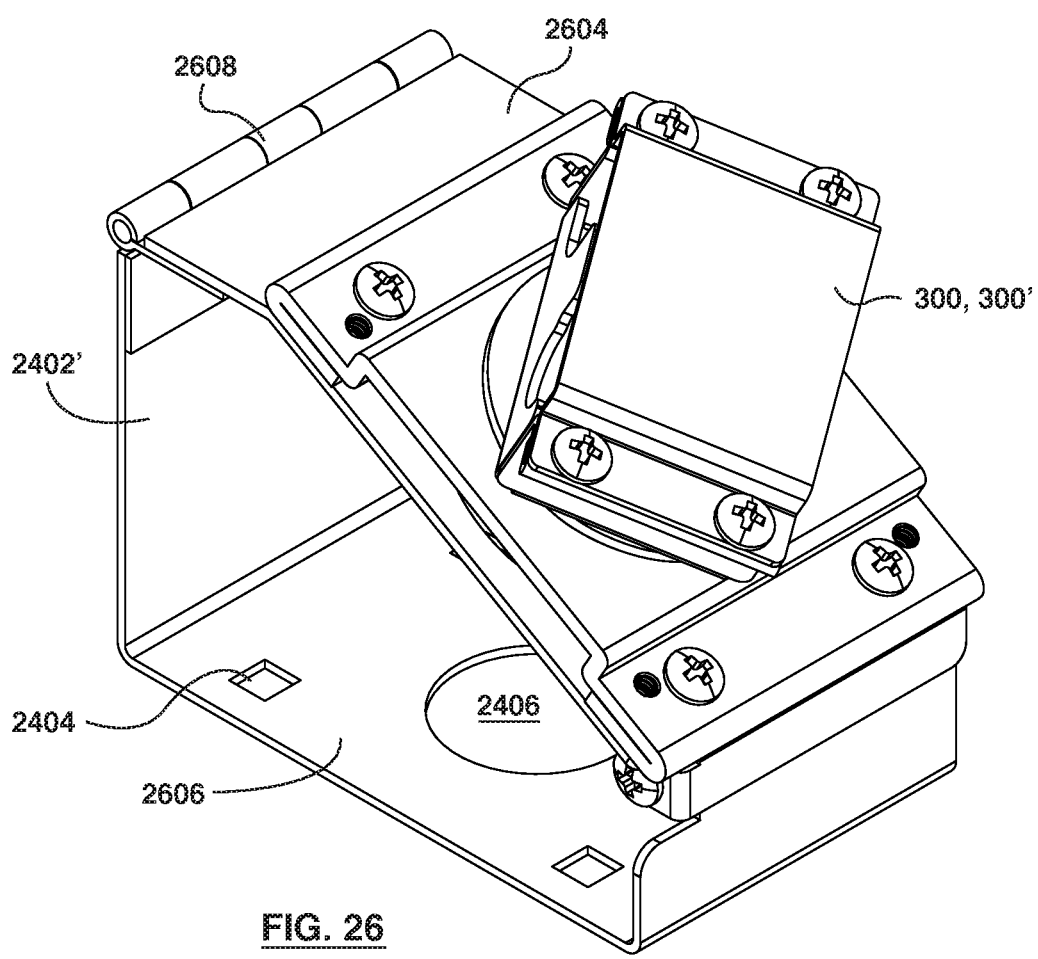
FIG. 26 is a front perspective view of a pivot assembly and stand for use in a security system according to a further example embodiment.
Figure 27:
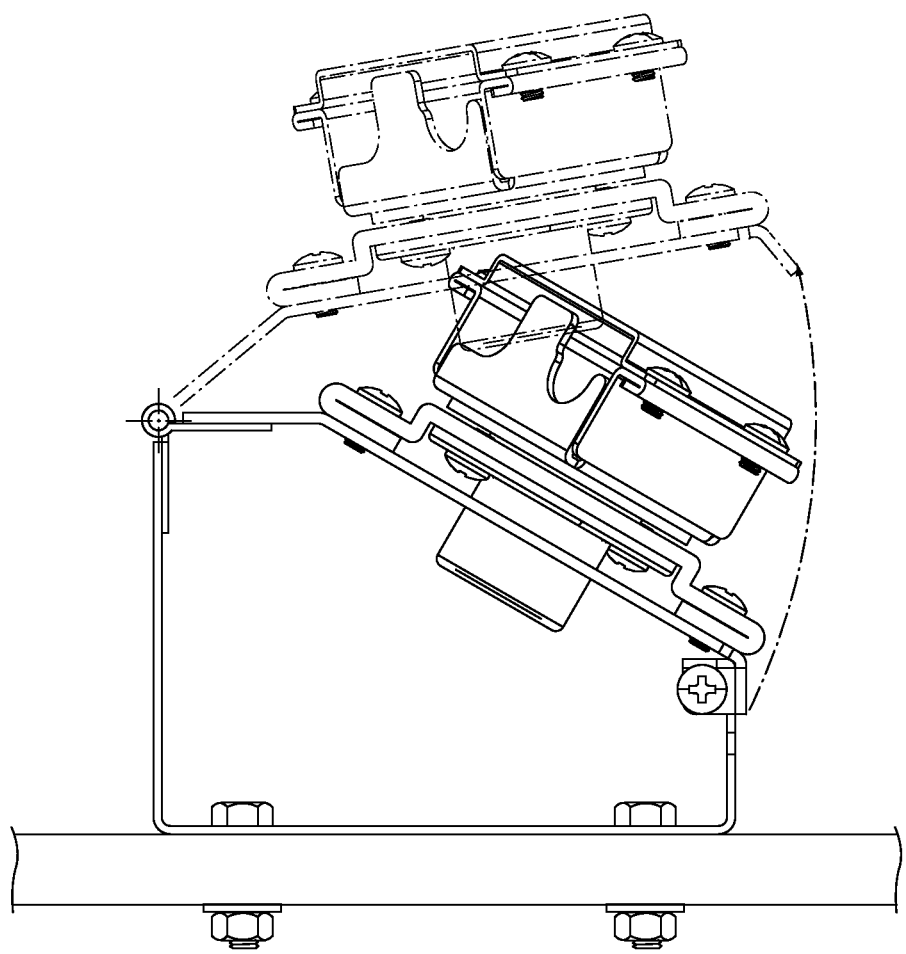
FIG. 27 is a side view of the pivot assembly and stand of FIG. 26.
Figure 28:
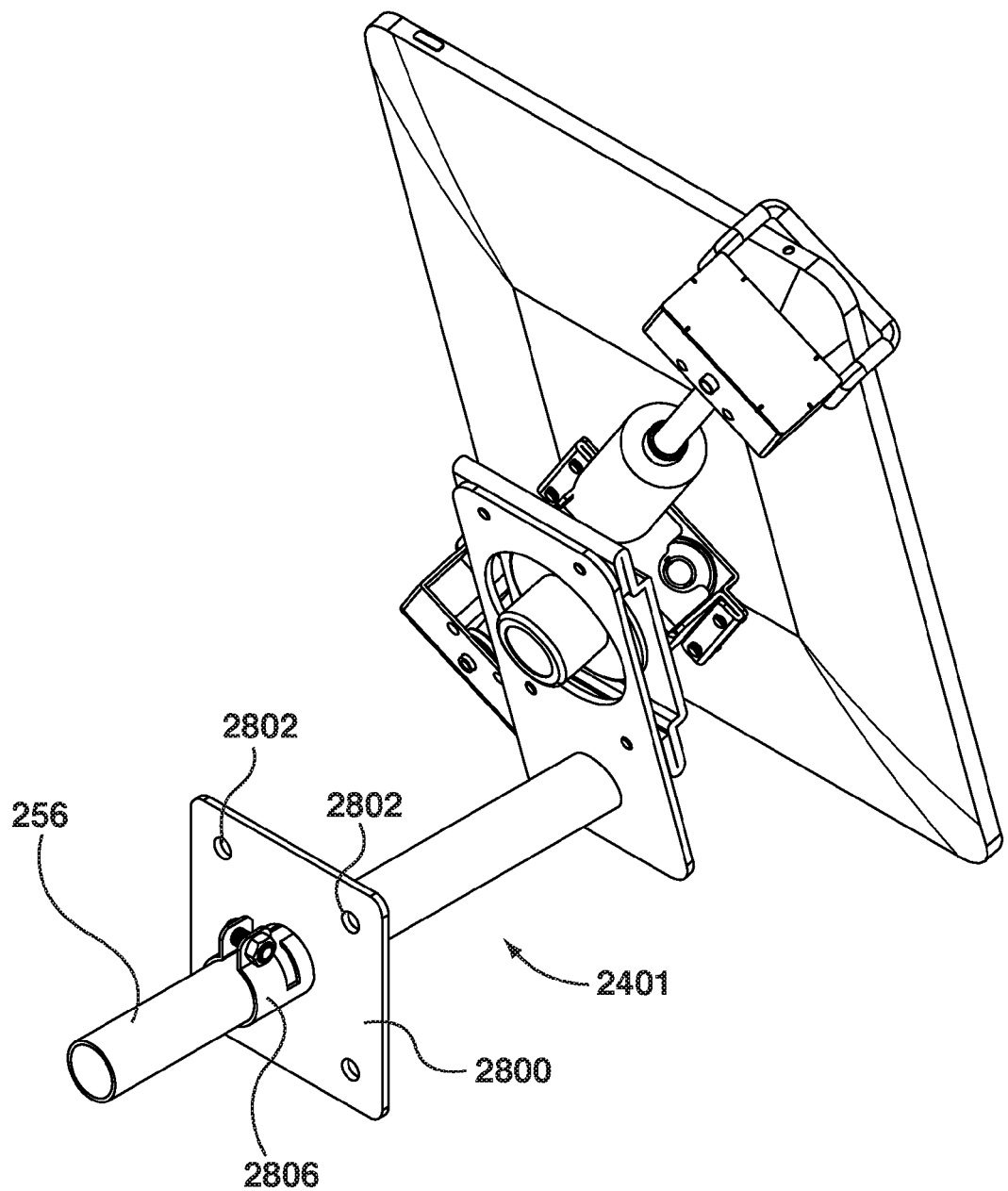
FIG. 28 is a rear perspective view of a security system according to another example embodiment.
Figure 29:
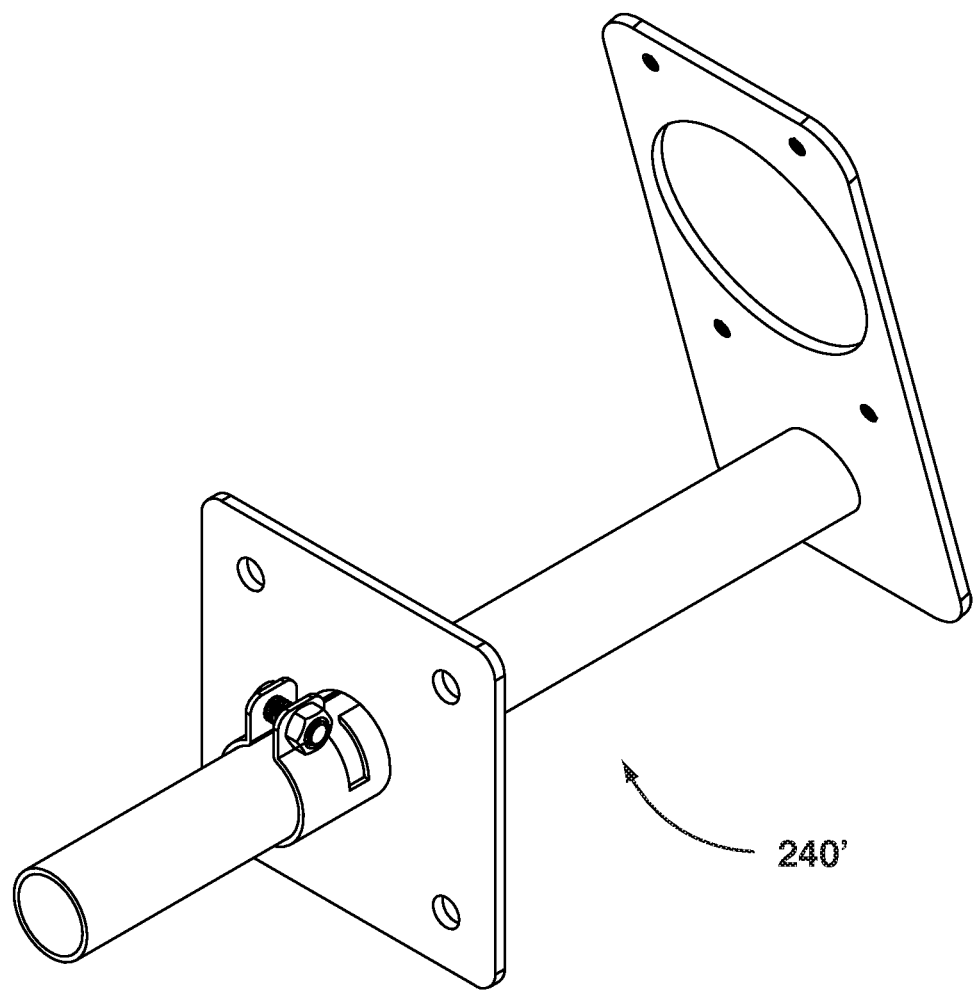
FIG. 29 is a rear perspective view of a mounting stand of the security system of FIG. 28.
Figure 30:
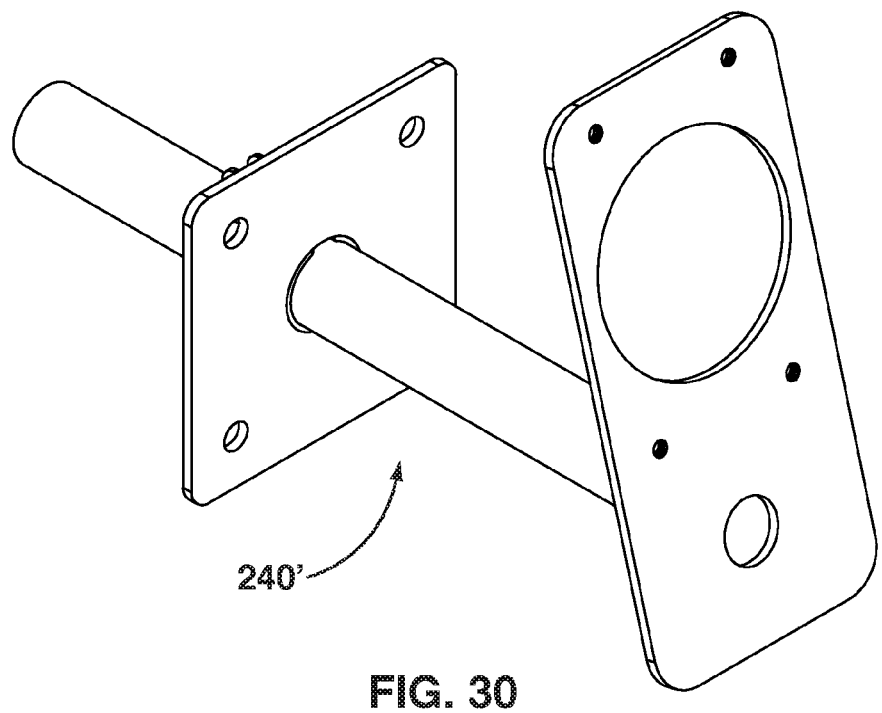
FIG. 30 is a front perspective view of the mounting stand of the security system of FIG. 28.

FIGS. 26 and 27 show another example of a security system similar to that shown in FIGS. 24 and 25 except that the display stand 2402' includes a hinged upper portion 2604 and a stationary lower portion 2606. Pivot assembly 300, 3001 is connected to the upper portion 2604, which can be pivoted about hinge 2608 relative to the lower portion 2606 to permit access to the adjustment screws located on the back of pivot assembly 300, 300'.

Figure 31:
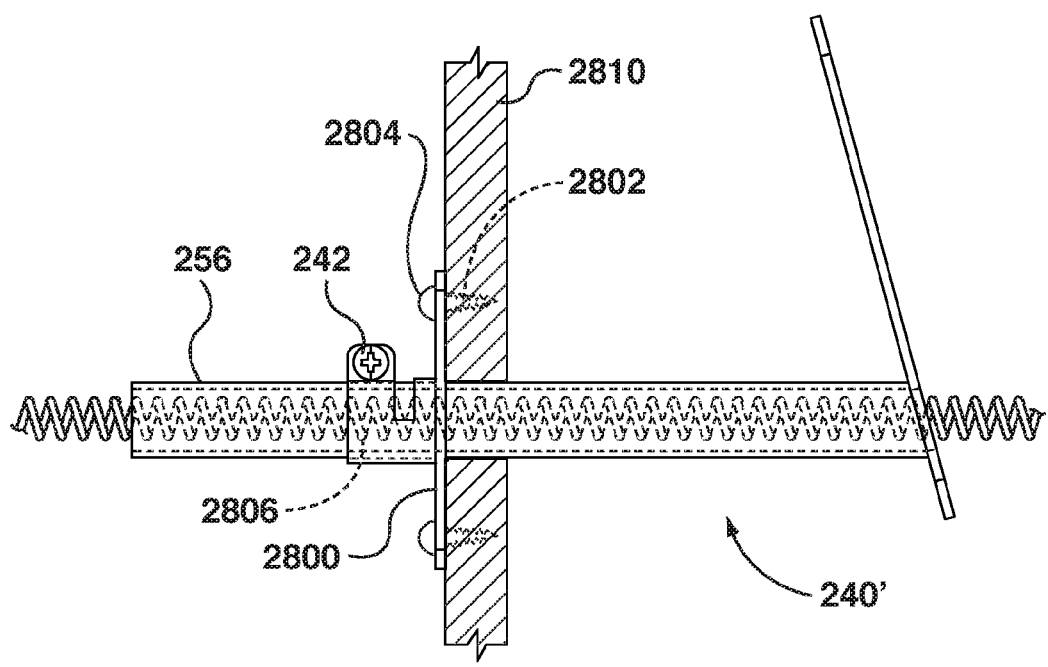
FIG. 31 is a sectional view of the mounting stand of the security system of FIG. 28.
Figure 32:
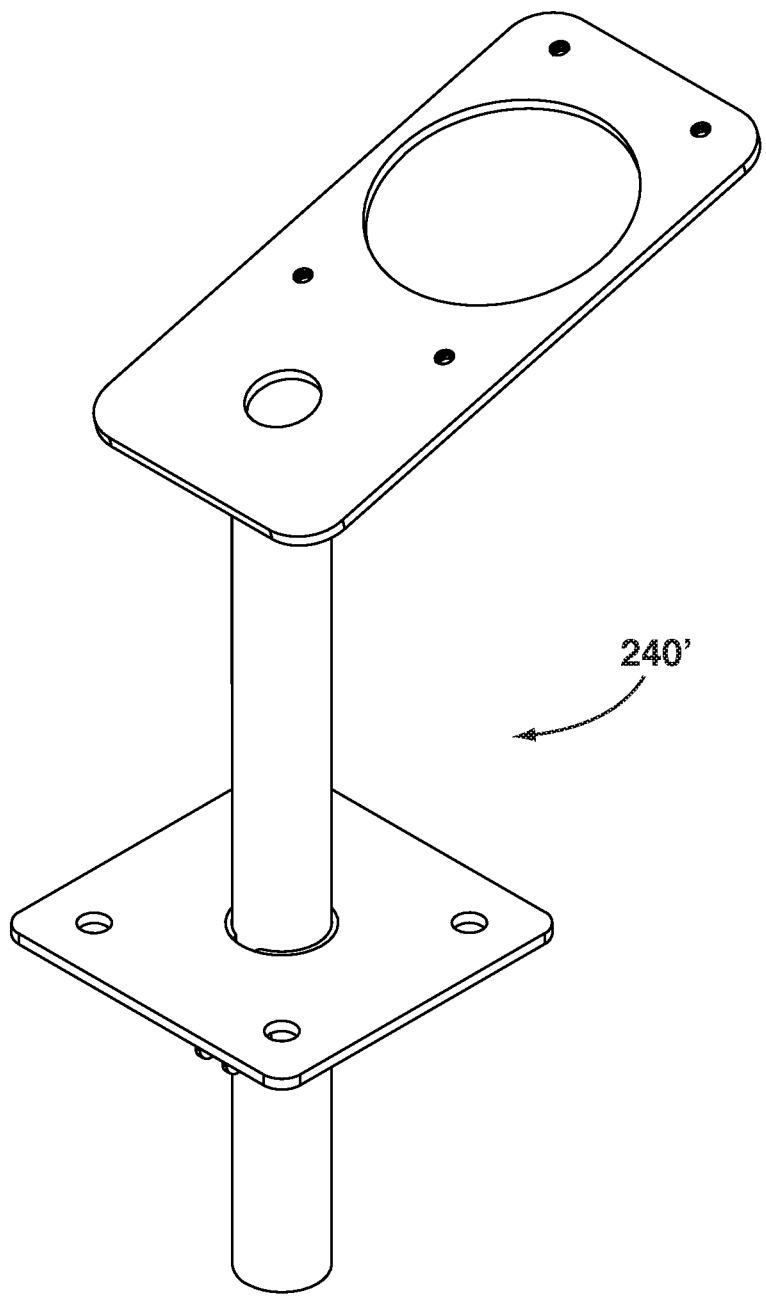
FIG. 32 is a further front perspective view of the mounting stand of the security system of FIG. 28.

FIGS. 28 to 32 show security system incorporating a stand 240' that is similar to the system and stand of FIGS. 12-15 except that the system of FIGS. 28-32 is configured to be mounted to a support surface without using track 600. In particular, in the embodiments of FIGS. 28, 32, disc base 246 is not present on post 256, and in its place a removable backing plate 2800 is provided. Backing plate 2800 includes a cylindrical locking assembly 2806 for securing the backing plate 2800 to the post 256, and the backing plate 2800 includes openings or holes 2802 for receiving fasteners 2804 (see FIG. 31). FIG. 31 shows the stand 240' mounted to a vertical support wall 2810 with screws 2804 securing the backing plate 2800 to the wall 2810. A screw 2812 in cylindrical assembly 2806 can be adjusted to allow the post 256 to be released or rotated.

Figure 34:
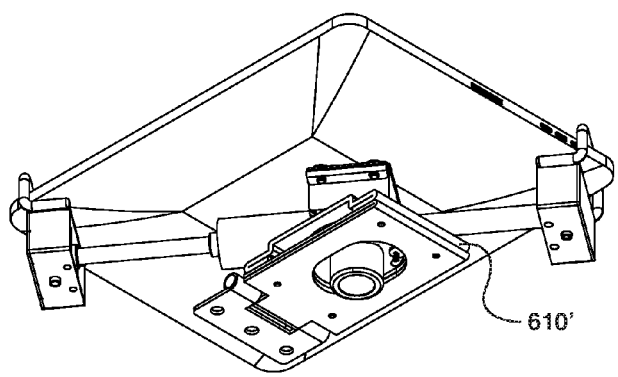
FIG. 34 is a rear perspective view of a security system incorporating the mounting bracket of FIG. 33.
Figure 33:
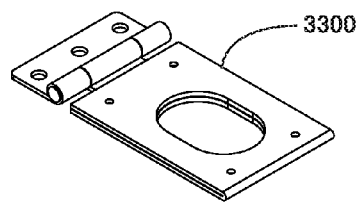
FIG. 33 is a perspective view of a mounting bracket for use with a security system according to another example embodiment.
Figure 35:
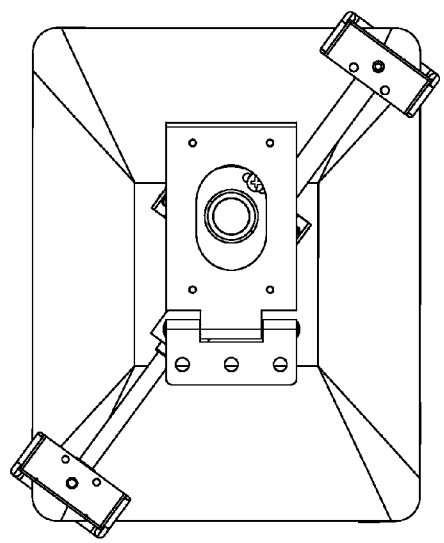
FIG. 35 is a back view of a security system incorporating the mounting bracket of FIG. 33.
Figure 36:
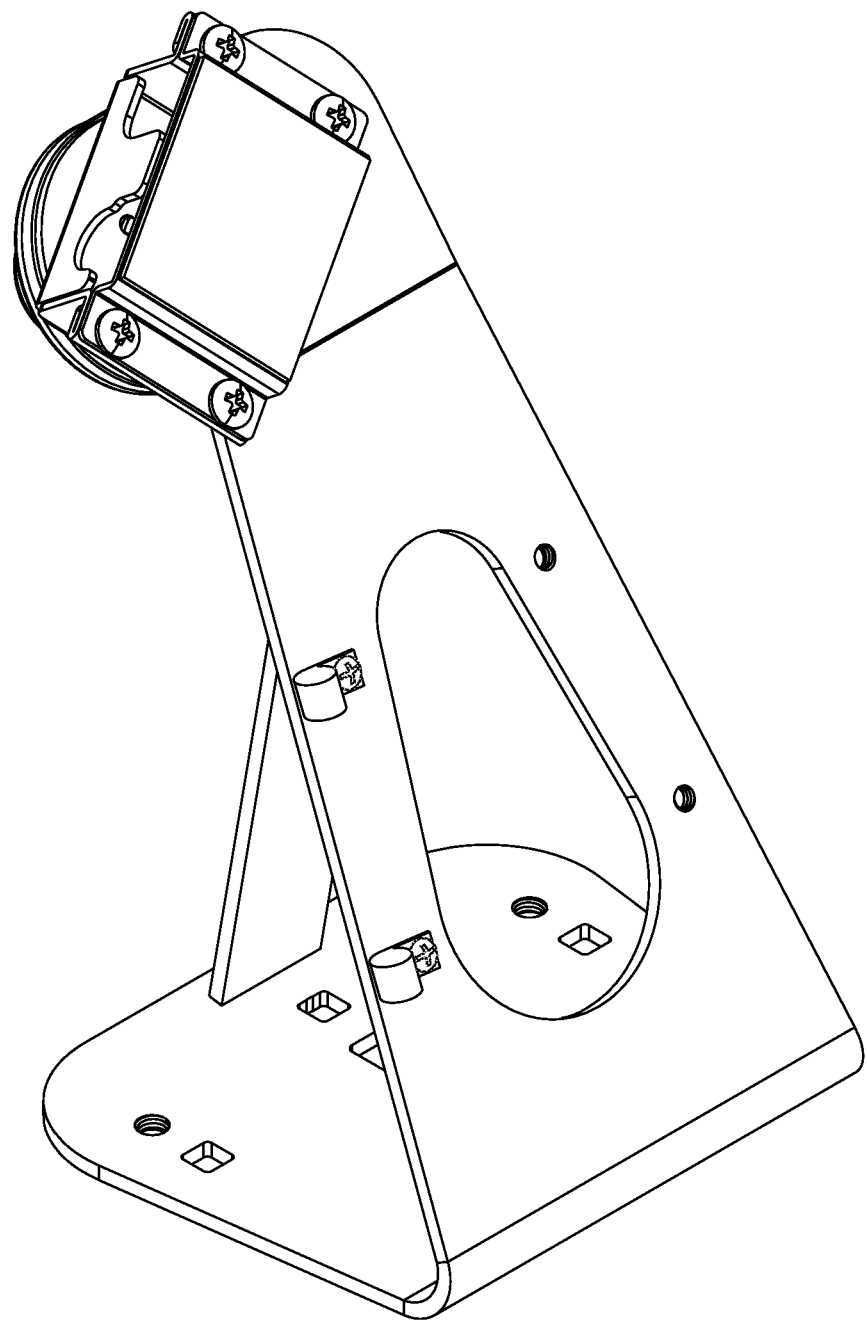
FIG. 36 is a front perspective view of a pivot assembly and stand according to another example embodiment.

FIGS. 33-35 show yet another embodiment of a security system in which mounting bracket 610' is secured to a mounting hinge 3300.

Figure 37:
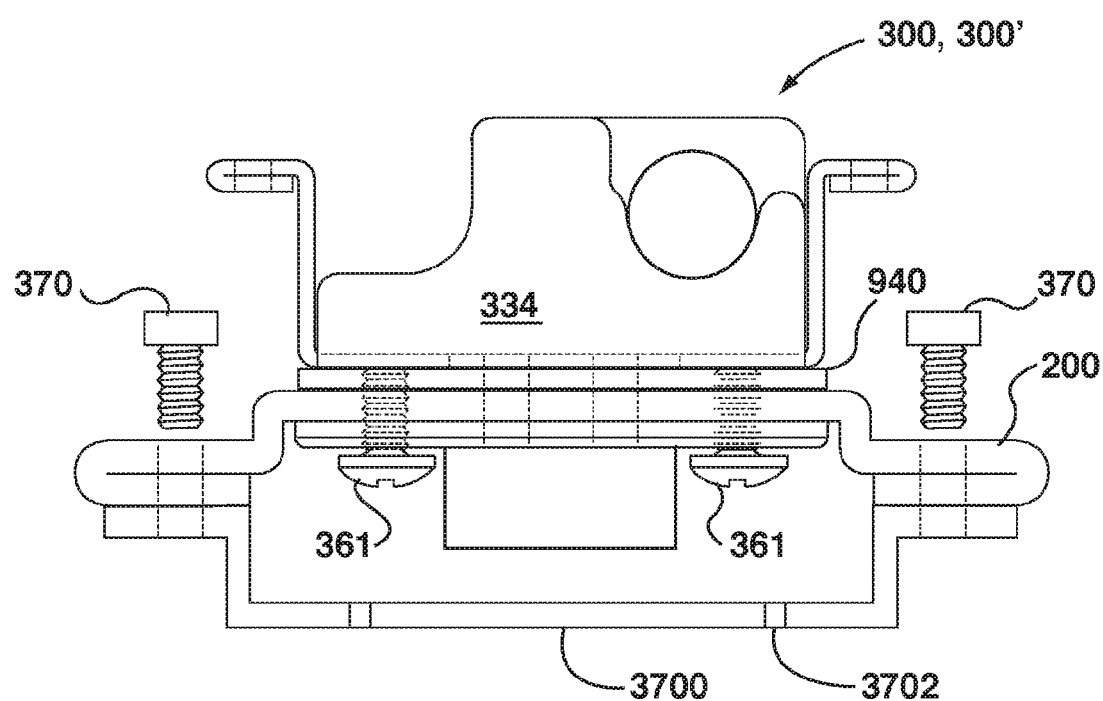
FIG. 37 is a side view of a pivot assembly combined with a further mounting bracket in accordance with a further example embodiment.

FIG. 37 illustrates a further example embodiment in which a mounting plate 3700 is secured to the back of the pivot assembly 300, 300' by screws 3704. The mounting plate provides a flat mounting surface so that the pivot assembly can be secured to virtually any surface by fasteners that pass through holes 3702. Access to holes 3702 is blocked by the pivot assembly 300 such that once an electronic device is secured to pivot assembly 300, 300', access to screws 3705 is prevented, which in turn prevents access to the mounting fasteners that pass through openings 3702.

Figure 38:
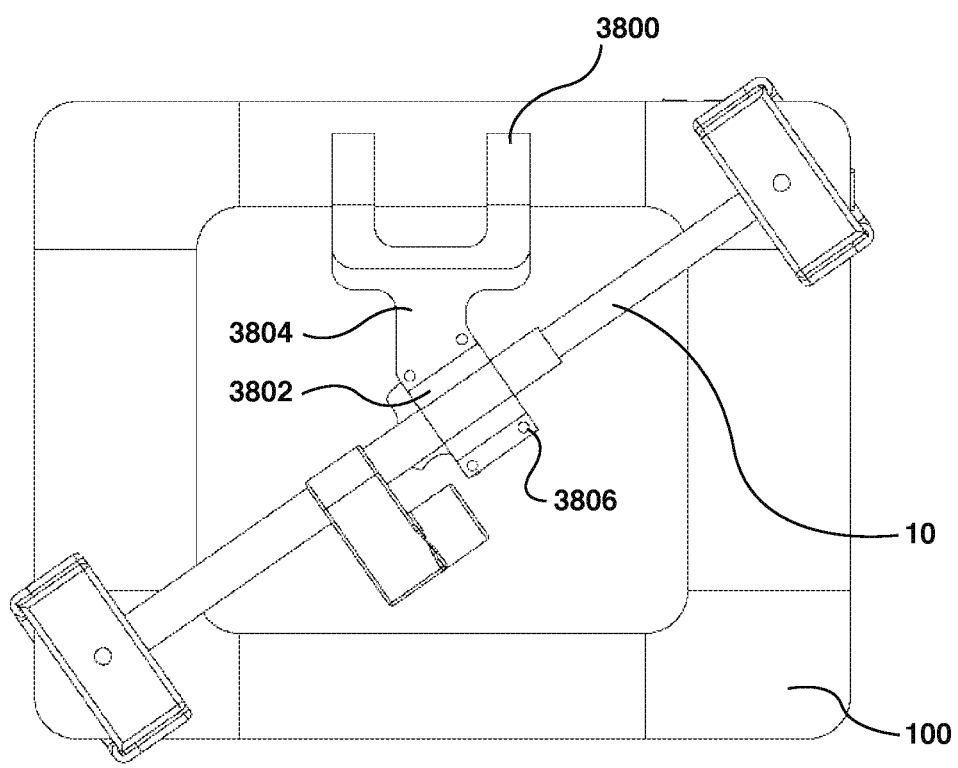
FIG. 38 is a back view of a security device securing a tablet according to a further example embodiment.
Figure 39:
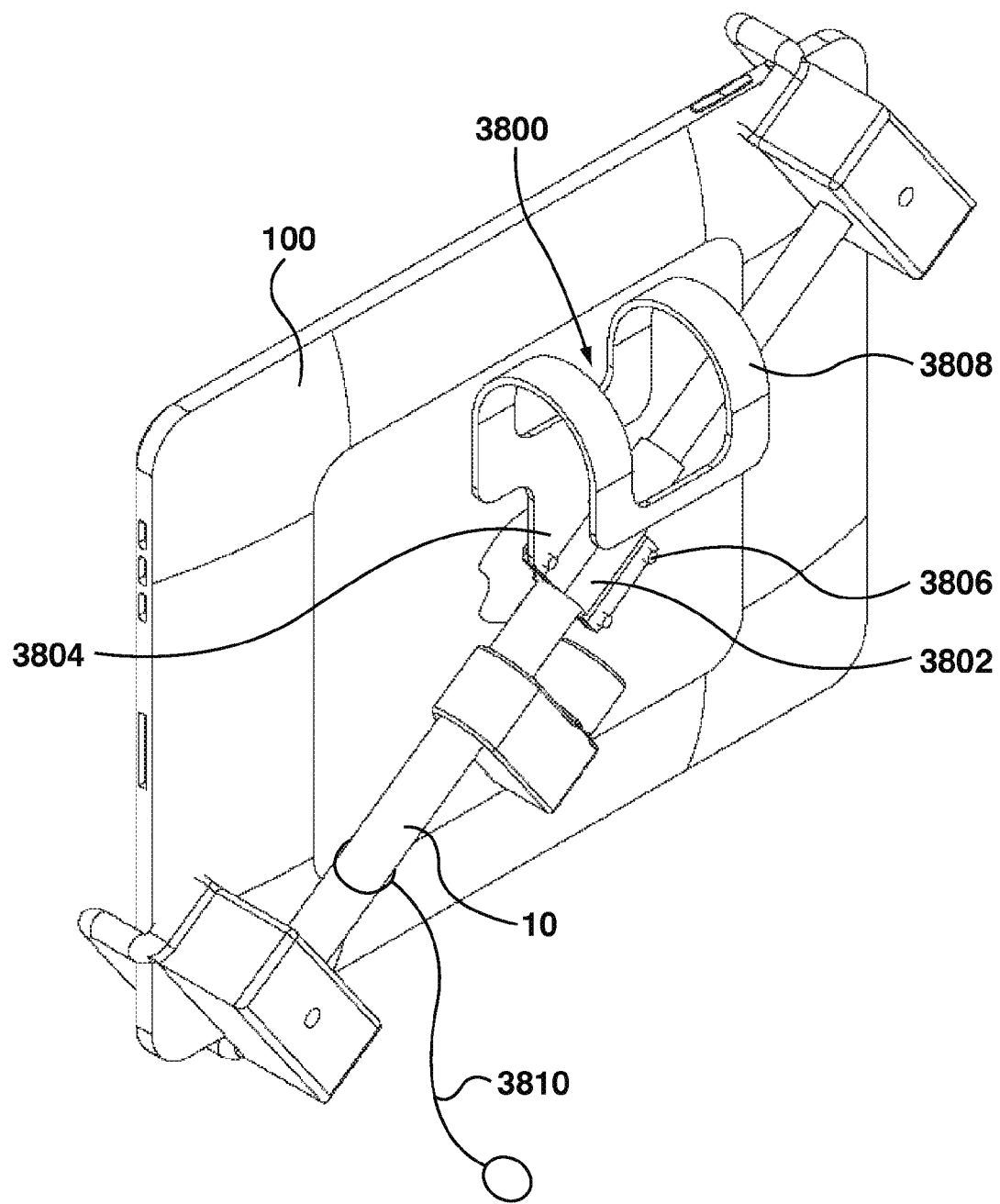
FIG. 39 is a perspective view of the security device of FIG. 38.
Figure 40:
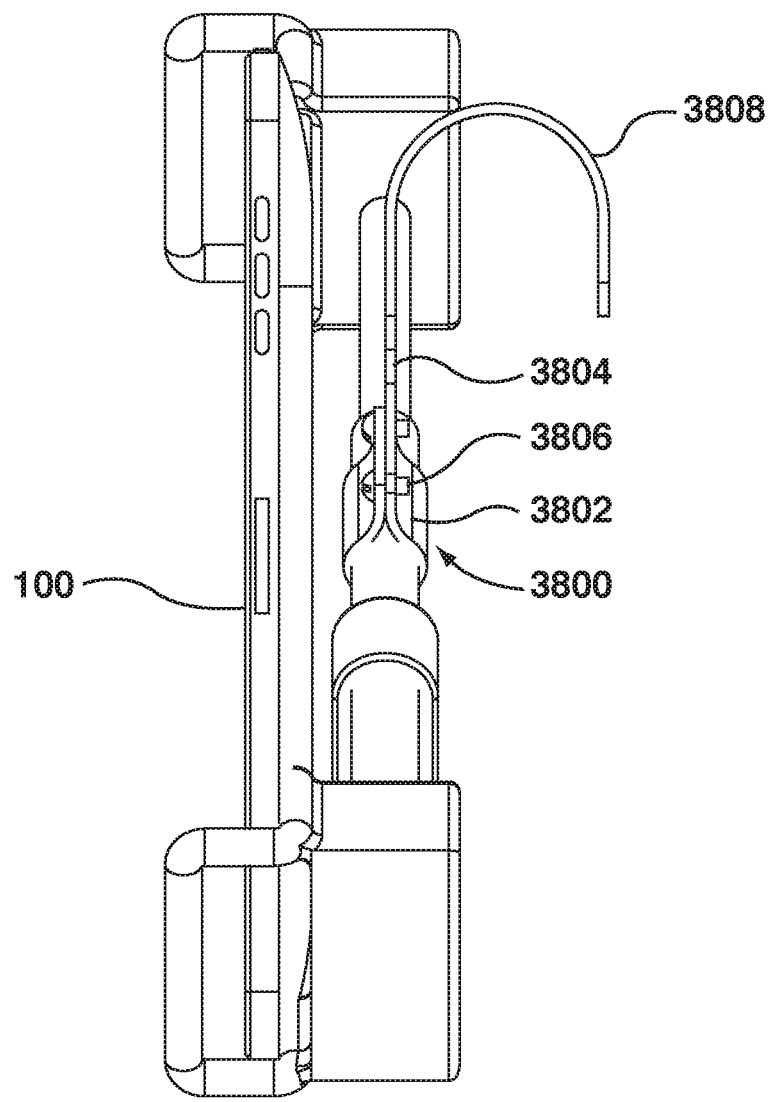
FIG. 40 is a side view of the security device of FIG. 38.

As noted above, in some embodiments core security device 10 can be used independently of the pivot assembly 300/300' to secure a component 100. FIGS. 38-40 illustrate a further example embodiment in which a support bracket 3800 is secured to core security device 10 without using pivot assembly 300/300'. The bracket 3800 includes two bracket members 3802 and 3804 secured together by screws 3806. The bracket members 3802 and 3806 define a passage through which one of the elongate arms of the security device 10 passes and is sandwiched therein. In one example the screws 3806 pass through holes in the forward bracket 3804 into threaded holes in the rearward bracket 3802 such that access to screws 3806 is restricted when component 100 is secured to the security device 10. As seen in FIG. 39 or 40, the bracket 3800 may include an inverted U-shaped hook member 3808 for hanging the security device and secured component in a display location. A cable 3810 (FIG. 39) can be used to secure the security device 3810.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole.

The invention claimed is:

1. An apparatus for securing a component to prevent unauthorized removal of the component, the apparatus comprising a security device for securing the component, the security device comprising:
    a first corner engagement member pivotally mounted to a first arm for engaging a first corner of the component;
    a second corner engagement member pivotally mounted to a second arm for engaging a second corner of the component that is diagonal to the first corner; and
    a locking assembly to secure the first arm relative to the second arm,
    the first corner engagement member and second corner engagement member each comprising: a base member, a pair of spaced apart edge engagement members extending from the base member, and a front engagement member spaced apart from the base member and attached to extending ends of the edge engagement members,
    the base member, edge engagement members and front engagement member of the first corner engagement member defining a first rectangular opening through which a portion of the first corner of the component can extend; and
    the base member, edge engagement members and front engagement member of the second corner engagement member defining a second rectangular opening through which a portion of the second corner of the component can extend.

2. The apparatus of claim 1 wherein the first corner engagement member is pivotally mounted by a first pin secured to the base member of the first corner engagement member to an end of the first arm, and the second corner engagement member is pivotally mounted by a second pin secured to the base member of the second corner engagement member to an end of the second arm,
    the base member of the first corner engagement member including a first pair of stop members limiting a degree of rotation of the first corner engagement member about an axis of the first pin;
    the base member of the second corner engagement member including a second pair of stop members limiting a degree of rotation of the second corner engagement member about an axis of the second pin.

3. The apparatus of claim 2 wherein the first corner engagement member is mounted to pivot in two orthogonal directions relative to the first arm and the second corner engagement member is mounted to pivot in two orthogonal directions relative to the second arm.

4. The apparatus of claim 1 wherein each corner engagement member can pivot at between a range of 5 to 15 degrees in each of the two directions.

5. The apparatus of claim 1 wherein each corner engagement member can pivot at least 5 degrees in each of the two directions.

6. The apparatus of claim 1 comprising a pivot assembly securing the security device to a support, the pivot assembly comprising an alignment mechanism enabling the security device to rotate between at least a first orientation and a second orientation.

7. The apparatus of claim 6 wherein the security device is removably secured to the pivot assembly so that the security device can be removed from the pivot assembly only when a component is not secured to the security device.

8. The apparatus of claim 6 wherein the pivot assembly includes a casing for releasably securing the security device, the casing including a cover that cannot be accessed when the component is secured to the security device.

9. The apparatus of claim 6 wherein the position of the first orientation and the second orientation are adjustable by an adjustment mechanism that can be accessed while the component is secured to the security device.

10. The apparatus of claim 9 wherein the adjustment mechanism comprises one or more fastening holes that can each be aligned with a plurality of through holes that pass through the support for securing the pivot assembly with one or more fasteners, wherein the fastening holes are elongated curved slots that provide a first level of adjustment and the plurality of through holes provide a second level of adjustment.

11. The apparatus claim 6 wherein the security device is removably secured to the pivot assembly and the pivot assembly is removably secured to the stand, wherein the pivot assembly cannot be removed from the stand when the security device is secured to the pivot assembly and the security device cannot be removed from the pivot assembly when securing the component.

12. An apparatus for securing a component to prevent unauthorized removal of the component, the apparatus comprising:
a security device for securing the component, the security device comprising:
a first corner engagement member for engaging a first corner of the component;
a second corner engagement member for engaging a second corner of the component that is diagonal to the first corner; and
a locking assembly to secure the first corner engagement member relative to the second corner engagement member; and
a pivot assembly securing the security device to a support, the pivot assembly comprising an alignment mechanism enabling the security device to rotate between at least a first orientation and a second orientation,
wherein the security device is removably secured to the pivot assembly and the pivot assembly is removably secured to the stand, wherein the pivot assembly cannot be removed from the stand when the security device is secured to the pivot assembly and the security device cannot be removed from the pivot assembly when securing the component.

13. The apparatus of claim 12 wherein the first corner engagement member and the second corner engagement member are each semi-rigidly mounted to respective arms that extend to the locking assembly such that the first corner engagement member and the second corner engagement member can each be moved in two dimensions relative to their respective arms.

14. The apparatus of claim 13 wherein each corner engagement member can pivot at least 5 degrees in each of the two dimensions.

15. The apparatus of claim 12 wherein the pivot assembly comprises an inner cylindrical member that is nested within a surrounding wall, the inner cylindrical member having a spring loaded cam follower extending therefrom to interact with a cam surface defined by the surrounding wall, the cam surface defining a first index point and as second index point that cooperate with the cam follower to bias the security device in the first orientation and the second orientation respectively.

16. The apparatus of claim 15 wherein the component is a rectangular electronic device and the first orientation and the second orientation correspond to a portrait view and a landscape view of the rectangular electronic device, the cam surface being configured to allow the security device to be rotated back and forth between the first orientation and the second orientation, but prevent any rotation beyond the first orientation and the second orientation.

17. The apparatus of claim 12 wherein the pivot assembly includes a casing for releasably securing the security device, the casing including a cover that cannot be accessed when the component is secured to the security device.

18. The apparatus of claim 2 wherein:
the base member of the first corner engagement member defines a socket receiving the end of the first arm, the first pin being secured at opposite ends to the base member of the first corner engagement member and having a central portion passing through a hole in the end of the first arm; and
the base member of the second corner engagement member defines a socket receiving the end of the second arm, the second pin being secured at opposite ends to the base member of the second corner engagement member and having a central portion passing through a hole in the end of the second arm.

19. The apparatus of claim 18 wherein the first arm comprises a cylindrical rod and the second arm comprises a tubular arm telescopically receiving the cylindrical rod.

* * * * *